United States Patent [19]
Qian et al.

[11] Patent Number: 6,108,609
[45] Date of Patent: Aug. 22, 2000

[54] GRAPHICAL SYSTEM AND METHOD FOR DESIGNING A MOTHER WAVELET

[75] Inventors: Shie Qian, Austin, Tex.; Qiuhong Yang, Andover, Mass.

[73] Assignee: National Instruments Corporation, Austin, Tex.

[21] Appl. No.: 08/903,550

[22] Filed: Jul. 30, 1997

Related U.S. Application Data

[60] Provisional application No. 60/025,199, Sep. 12, 1996.

[51] Int. Cl.[7] .................................................. G06K 9/36
[52] U.S. Cl. ............................. 702/66; 382/207; 382/276
[58] Field of Search ................................ 702/66, 73, 189, 702/191; 382/191, 207, 276

[56] References Cited

PUBLICATIONS

Rioul et al. "A Remez Exchange Algorithm for Orthonormal Wavelets", IEEE, 1994.
The Wavelet Toolbox For Use with MATLAB, Matworks Inc., Mar. 3, 1996, selected pages from mathworks.com.
The Signal Processing Toolbox For Use with MATLAb, Mathworks, Jan. 1999, selected pages from mathworks.com.
Phoong et al., "A New Class of Two–Channel Biorthogonal Filter Banks and Wavelet Bases", IEEE, 1995.
Herley et al., "Wavelets and Recursive Filter Banks", IEEE, 1993.
*LabVIEW Graphical Programming for Instrumentation, Digital Filter Design Toolkit Reference Manual*, National Instruments, Aug. 1995, v–xi, 1–1 through 4–7, A–1 through G–2.

*Primary Examiner*—Patrick Assouad
*Attorney, Agent, or Firm*—Conley, Rose & Tayon P.C.; Jeffrey C. Hood

[57] ABSTRACT

An improved system and method for designing a mother wavelet. The system and method first displays on the screen a filter P(z), wherein a mother wavelet is associated with the filter P(z). The filter P(z) is a product of two low pass filters $G_0(z)$ and $H_0(z)$, which collectively comprise a perfect reconstruction filter bank which models the wavelet. The method then displays on the screen a plot which illustrates a zeros distribution of P(z), as well as other information, such as the mother wavelet function, correlations, frequency responses, etc. The user can then graphically adjust the zeros distribution of P(z) on the plot in order to obtain the desired mother wavelet. This involves factorizing P(z) into $G_0(z)$ and $H_0(z)$, wherein the factorizing includes assigning one or more of the zeros illustrated in the plot to the functions $G_0(z)$ and $H_0(z)$ in response to user input. The step of adjusting the zeros distribution of P(z) on the plot also includes selecting a type of filter P(z). The operation of adjusting the zeros distribution of P(z) operates to automatically adjust one or more of the mother wavelet, the correlation, and the frequency response which are displayed on the screen, thus providing immediate feedback as to the performance of the mother wavelet. This enables the user to make the optimum choice for the mother wavelet.

45 Claims, 22 Drawing Sheets

Sum of Two Truncated Sine Waveforms

Wavelet

Wavelet Analysis

Short-Time Fourier Transform Sampling Grid

Wavelet Transform Sampling Grid

Comparison of Transform Processes

Two-Channel Filter Bank

Relationship Of Two-Channel PR Filter
Banks To Wavelet Transform

Filter Bank And Wavelet Transform Coefficients

Halfband Filter

Zeros Distribution for $(1-z^{-1})^6 Q(Z)$

B-Spline Filter Bank

Dual B-Spline Filter Bank

Third Order Daubechies Filter Banks and Wavelets

2D Signal Processing

Computer

Design Procedure for Wavelets and Filter Banks

Non-Negative Equiripple Halfband Filter

| Filter | Zeros | Property | Illustration |
|---|---|---|---|
| Real | complex conjugate symmetrical | easy to implement | Figure 20 |
| Minimum Phase | $|z_i| \leq 1$ for all i (on or inside of unit circle)<br><br>all zeros have to be on or inside of the unit circle | important for control systems | Figure 22a |
| Linear Phase | must contain both $z_i$ and its reciprocal $1/z_i$<br><br>the pair of reciprocals must be in the same filter | desirable for image processing | Figure 22b |
| Orthogonal | cannot have $z_i$ and its reciprocal $1/z_i$ simultaneously<br><br>$z_i$ and its reciprocal has to be in the separated filters, contradictory to linear phase | analysis and synthesis have the same performance<br><br>convenience for bit allocation and quantization error control<br><br>not linear phase<br><br>even length (N odd) | Figure 22c |

Filter Comparison

Fig. 21

Minimum Phase Filter

Linear Phase Filter

Orthogonal Filter

Design Panel

Equiripple Filter

ID_Test Panel

DAQ Setup Panel

Specifying a Path

2D_Test Panel

Wavelets and Filters

Full Path of a Three Level PR Tree

Wavelet Packet

Implementation of a Wavelet Packet

Detection of Discontinuity

Signal Seperation

Detection of Discontinuity

Multiscale Analysis

Detrend

Original Image   Reconstruction

Denoise

GRAPHICAL SYSTEM AND METHOD FOR DESIGNING A MOTHER WAVELET

PROVISIONAL DATA

This application claims benefit of priority of provisional application Ser. No.: 60/025,199 filed Sep. 12, 1996.

BACKGROUND OF THE INVENTION

Although Alfred Haar first mentioned the term wavelet in a 1909 thesis, the idea of wavelet analysis did not receive much attention until the late 1970s. Since then, wavelet analysis has been studied thoroughly and applied successfully in many areas. Current wavelet analysis is thought by some to be no more than the recasting and unifying of existing theories and techniques. Nevertheless, the breadth of applications for wavelet analysis is more expansive than ever was anticipated.

The development of wavelet analysis originally was motivated by the desire to overcome the drawbacks of traditional Fourier analysis and short-time Fourier transform processes. The Fourier transform characterizes the frequency behaviors of a signal, but not how the frequencies change over time. The Short-time Fourier transform, or windowed Fourier transform, simultaneously characterizes a signal in time and frequency. However, problems may be encountered because the signal time and frequency resolutions are fixed once the type of window is selected. However, signals encountered in nature always have a long time period at low frequency and a short time period at high frequency. This suggests that the window should have high time resolution at high frequency.

To understand the fundamentals of wavelet analysis, consider the following artificial example. FIG. 1 shows a signal s(t) that consists of two truncated sine waveforms. While the first waveform spans 0 to 1 second, the second waveform spans 1 to 1.5 seconds. In other words, the frequency of s(t) is 1 Hz for $0 \leq t < 1$ and 2 Hz for $1 \leq t < 1.5$.

When describing frequency behavior, s(t) is traditionally compared with a group of harmonically related complex sinusoidal functions, such as $\exp\{j2\pi kt/T\}$. Here, the term harmonically related complex sinusoidal functions refers to the sets of periodic sinusoidal functions with fundamental frequencies that are all multiples of a single positive frequency $2\pi/T$. The comparison process is accomplished with the following correlation (or inner product) operation:

$$a_k = \int_T s(t) e_k^*(t) dt = \int_T s(t) \exp\left\{-j \frac{2\pi k}{T} t\right\} dt \qquad (3\text{-}1)$$

where $a_k$ is the Fourier coefficient, and * denotes a complex conjugate.

The magnitude of $a_k$ indicates the degree of similarity between the signal s(t) and the elementary function $\exp\{j2\pi kt/T\}$. If this quantity is large, it indicates a high degree of correlation between s(t) and $\exp\{j2\pi kt/T\}$. If this quantity is almost 0, it indicates a low degree of correlation between s(t) and $\exp\{j2\pi kt/T\}$. Therefore, $a_k$ can be considered as the measure of similarity between the signal s(t) and each of the individual complex sinusoidal functions $\exp\{j2\pi kt/T\}$. Because $\exp\{j2\pi kt/T\}$ represents a distinct frequency $2\pi k/T$ (a frequency tick mark), the Fourier coefficient $a_k$ indicates the amount of signal present at the frequency $2\pi k/T$.

In FIG. 1, Sum of Two Truncated Sine Waveforms, s(t) consists of two truncated sine waveforms. The inner product of such truncated signal and pure sine waveforms, which extends from minus infinity to plus infinity, never vanishes, that is, $a_k$ is not zero for all k. However, the dominant $a_k$, with the largest magnitude, is that which corresponds to 1 and 2 Hz elementary functions. This indicates that the primary components of s(t) are 1 and 2 Hz signals. However, it is unclear, based on $a_k$ alone, when the 1 Hz or the 2 Hz components exist in time.

There are many ways of building the frequency tick marks to measure the frequency behavior of a signal. By using complex sinusoidal functions, not only can the signals be analyzed, but the original signal can be reconstructed with the Fourier coefficient $a_k$. For example, s(t) can be written in terms of the sum of complex sinusoidal functions, according to the following formula, traditionally known as the Fourier expansion.

$$s(t) = \sum_{k=-\infty}^{\infty} a_k e_k(t) = \sum_{k=-\infty}^{\infty} a_k \exp\left\{j \frac{2\pi t}{T} k\right\} \qquad (3\text{-}2)$$

where $a_k$ is the Fourier coefficient and $2\pi k/T$ is the frequency tick mark. In this equation, because $a_k$ is not zero for all k, an infinite number of complex sinusoidal functions must be used in (3-2) to restore s(t) in FIG. 1, Sum of Two Truncated Sine Waveforms.

Wavelet Analysis

Looking at s(t) more closely, to determine the frequency contents of s(t), information is only needed regarding one cycle, such as the time span of one cycle. With this information, the frequency can be computed with the following formula:

$$\text{frequency} = \frac{1}{\text{time span of one cycle}}$$

According to this equation, the higher the frequency, the shorter the time span. Therefore, instead of using infinitely long complex sinusoidal functions, it is only necessary to use one cycle of a sinusoidal waveform, or a wavelet, to measure s(t). The wavelet $\psi(t)$ used to measure s(t) is one cycle of sinusoidal waveform, as shown in FIG. 2.

Because $\psi(t)$ spans 1 second, consider the frequency of $\psi(t)$ to be 1 Hz. As in the case of Fourier analysis, the comparison process can be achieved with the following correlation (or inner product) operation:

$$W_{m,n} = \int_T s(t) \psi_{m,n}(t) dt \qquad (3\text{-}3)$$

where $W_{m,n}$ denotes the wavelet transform coefficients and $\psi_{m,n}(t)$ are the elementary functions of the wavelet transform.

However, the structure of the elementary functions $\psi_{m,n}(t)$ differs from the Fourier transformations, which are the dilated and shifted versions of $\psi(t)$, that is, $$\psi_{m,n}(t) = 2^{m/2} \psi(2^m(t - n2^{-m})) \qquad (3\text{-}4)$$

where m and n are integers.

By increasing n, $\psi_{m,n}(t)$ is shifted forward in time. By increasing m, the time duration is compressed which thereby increases the center frequency and frequency bandwidth of $\psi(t)$. For more information on this, please see Qian and Chen, *Joint Time Frequency Analysis*, Prentice-Hall 1996. The parameter m can be considered as the scale factor and $2^{-m}$ as the sampling step. Therefore, the shorter the time duration, the smaller the time sampling step, and vice versa. Assuming the center frequency of ψ(t) is ωo, then the center frequency of $\psi_{m,n}(t)$ would be $2^m\omega_0$. Consequently, the scale factor m can be systematically adjusted to achieve different frequency tick marks to measure the signal frequency contents. That is, as the scale factor m increases, the center frequency and bandwidth of the wavelet increases $2^m$.

FIG. 3 depicts the wavelet transform procedure. First, let m=n=0, that is, align ψ(t) and s(t) at t=0. Then, as in equation (3-4), compare ψ(t) with s(t) for 0≤t<1. $W_{0,0}=1$ is obtained. Shift ψ(t) to the next second, that is, let n=1, and compare it with s(t) for 1≤t<2. $W_{0,1}=0$ is obtained.

Next, compress Mf(t) into 0 to 0.5 seconds, that is, let m=1, and repeat the previous operations with the time-shift step 0.5. The following results are obtained, also displayed in the shaded table of FIG. 3, Wavelet Analysis, from this process:

$$W_{1,0}=0 \quad W_{1,1}=0 \quad W_{1,2}=1 \quad W_{1,3}=0$$

One can continue to compress ψ(t) by increasing the scale factor m and reducing the time-shift step $2^{-m}$ to test s(t). This procedure is called the wavelet transform. ψ(t) is called the mother wavelet because the different wavelets used to measure s(t) are the dilated and shifted versions of this wavelet. The results of each comparison, $W_{m,n}$, are named wavelet coefficients. The index m and n are the scale and time indicators, respectively, which describe the signal behavior in the joint time-scale domain (As shown in FIG. 5, Wavelet Transform Sampling Grid, the scale can be easily converted into frequency. Hence, $W_{m,n}$ also can be considered the signal representation in the joint time and frequency domain). In this example, by checking the wavelet coefficients, it is known that for 0≤t<1 the frequency of s(t) is 1 Hz and for 1≤t<1.5 the frequency of s(t) is 2 Hz. Unlike Fourier analysis, the wavelet transform not only indicates what frequencies the signal s(t) contains, but also when these frequencies occur. Moreover, the wavelet coefficients $W_{m,n}$ of a real-valued signal s(t) are always real as long as real-valued ψ(t) is chosen. Compared to the Fourier expansion, fewer wavelet functions can usually be used to represent the signal s(t). In this example, s(t) can be completely represented by two terms, whereas an infinite number of complex sinusoidal functions would be needed in the case of Fourier expansion.

Wavelet Analysis vs. Fourier Analysis

The short-time Fourier transform can be applied to characterize a signal in both the time and frequency domains simultaneously. However, wavelet analysis can also be used to perform the same function because of its similarity to the short-time Fourier transform. Both are computed by the correlation (or inner product) operation, but the main difference lies in how the elementary functions are built.

For the short-time Fourier transform, the elementary functions used to test the signal are time-shifted, frequency-modulated single window functions, all with some envelope. Because this modulation does not change the time or frequency resolutions (Qian and Chen 1996), the time and frequency resolutions of the elementary functions employed in short-time Fourier transform are constant. FIG. 4 illustrates the sampling grid for the short-time Fourier transform.

For the wavelet transform, increasing the scale parameter m reduces the width of the wavelets. The time resolution of the wavelets improves and the frequency resolution becomes worse as m becomes larger. Because of this, wavelet analysis has good time resolution at high frequencies and good frequency resolution at low frequencies.

FIG. 5 illustrates the sampling grid for the wavelet transform. Suppose that the center frequency and bandwidth of the mother wavelet ψ(t) are $\omega_0$ and $\Delta_\omega$, respectively. Then, the center frequency and bandwidth of ψ($2^m$t) are $2^m\omega_0$ and $2^m\Delta_\omega$. Although the time and frequency resolutions change at different scales m, the ratio between bandwidth and center frequency remains constant. Therefore, wavelet analysis is also called constant Q analysis, where Q=center frequency/bandwidth.

The wavelet transform is closely related to both conventional Fourier transform and short-time Fourier transform. As shown in FIG. 6, Comparison of Transform Processes, all these transform processes employ the same mathematical tool, the correlation operation or inner product, to compare the signal s(t) to the elementary function $b_\alpha(t)$. The difference lies in the structure of the elementary functions $\{e_\alpha(t)\}$. In some cases, wavelet analysis is more natural because the signals always have a long time cycle at low frequency and a short time cycle at high frequency.

Background on the design of two-channel perfect reconstruction filter banks and the types of filter banks used with wavelet analysis is deemed appropriate.

Digital Filter Banks

The wavelet transform can be implemented with specific types of digital filter banks known as two-channel perfect reconstruction filter banks. The following describes the basics of two-channel perfect reconstruction filter banks and the types of digital filter banks used with wavelet analysis. The following describes the design of two-channel perfect reconstruction filter banks and defines the types of filter banks used with wavelet analysis.

Two-Channel Perfect Reconstruction Filter Banks

Two-channel perfect reconstruction (PR) filter banks were recognized as useful in signal processing for a long time, particularly after their close relationship with wavelet transform was discovered. Since then, it has become a common technique for computing wavelet transform.

FIG. 7 illustrates a typical two-channel filter bank system. The signal X(z) is first filtered by a filter bank constituted by $G_0(z)$ and $G_1(z)$.

It is noted that, for a finite impulse response (FIR) digital filter g[n], its z-transform is defined as $$G(z) = \sum_{n=0}^{N} g[n]z^{-n} = G(e^{j\omega}) = G(\omega) = \sum_{n=0}^{N} g[n]e^{-j\omega n} \quad (3\text{-}5)$$

where N denotes the filter order. Consequently, the filter length is equal to N+1. Clearly, ω=0 is equivalent to z=1. ω=π is equivalent to z=−1. That is, G(O) and G(π) in the frequency domain correspond to G(1) and G(−1) in the z-domain.

Then, outputs of $G_0(z)$ and $G_1(z)$ are downsampled by 2 to obtain $Y_0(z)$ and $Y_1(z)$. After some processing, the modified signals are upsampled and filtered by another filter bank constructed by $H_0(z)$ and $H_1(z)$. If no processing takes place between the two filter banks, that is, $Y_0(z)$ and $Y_1(z)$ are not altered, the sum of outputs of $H_0(z)$ and $H_1(z)$ is identical to the original signal X(z), except for the time delay. Such a system is commonly referred to as two-channel PR filter banks. $G_0(z)$ and $G_1(z)$ form an analysis filter bank, whereas $H_0(z)$ and $H_1(z)$ form a synthesis filter bank.

It is noted that G(z) and H(z) can be interchanged. For instance, $H_0(z)$ and $H_1(z)$ can be used for analysis and $G_0(z)$ and $G_1(z)$ can be used for synthesis. $H_0(z)$ and $H_1(z)$ are usually considered as the dual of $G_0(z)$ and $G_1(z)$, and vice versa. Traditionally, $G_0(z)$ and $H_0(z)$ are lowpass filters, while $G_1(z)$ and $H_1(z)$ are highpass filters, where the subscripts 0 and 1 represent lowpass and highpass filters, respectively. Because the two-channel PR filter banks process $Y_0(z)$ and $Y_1(z)$ at half the sampling rate of the original signal $X(z)$, they attract many signal processing applications.

If the convention illustrated in FIG. 8 is assumed, then the relationship between two-channel PR filter banks and wavelet transform can be illustrated by FIG. 9.

It is proven (Qian and Chen 1996) that under certain conditions, two-channel PR filter banks are related to wavelet transform in two ways:

The impulse response of the lowpass filters converges to the scaling function $\phi(t)$. Once $\phi(t)$ is obtained, the mother wavelet function $\psi(t)$ can be computed by highpass $\phi(t)$, as shown in FIG. 9.

The outputs of each of the highpass filters are approximations of the wavelet transform. The wavelet transform can be accomplished with a tree of two-channel PR filter banks. The selection of a desirable mother wavelet becomes the design of two-channel PR filter banks.

FIG. 10 illustrates the relationship of filter banks and wavelet transform coefficients.

The following sections describe the design fundamentals for two types of two-channel PR filter banks, biorthogonal and orthogonal.

Biorthogonal Filter Banks

Referring back to FIG. 8, Two-Channel Filter Bank, the output of the low-channel can be defined as $$\hat{Y}_0(z) = \frac{1}{2} H_0(z)[G_0(z)X(z) + G_0(-z)X(-z)]. \tag{3-6}$$

Similarly, the output of the up-channel can be defined as $$\hat{Y}_1(z) = \frac{1}{2} H_1(z)[G_1(z)X(z) + G_1(-z)X(-z)]. \tag{3-7}$$

Add them together to obtain $$\frac{1}{2}[H_0(z)G_0(z) + H_1(z)G_1(z)]X(z) + \tag{3-8}$$

$$\frac{1}{2}[H_0(z)G_0(-z) + H_1(z)G_1(-z)]X(-z)$$

One term involves $X(z)$ while the other involves $X(-z)$. For perfect reconstruction, the term with $X(-z)$, traditionally called the alias term, must be zero. To achieve this, the following equation is used, $$H_0(z)G_0(-z)+H_1(z)G_1(-z)=0, \tag{3-9}$$

which is accomplished by letting $$H_0(z)=G_1(-z) \text{ and } H_1(z)=-G_0(-z). \tag{3-10}$$

The relationship in equation (3-10) implies that $h_0[n]$ can be obtained by alternating the sign of $g_1[n]$, that is, $$h_0[n]=(-1)^n g_1[n]. \tag{3-11}$$

Similarly, $$h_1[n]=(-1)^{n+1} g_0[n]. \tag{3-12}$$

Therefore, $g_1[n]$ and $h_1[n]$ are the highpass filters if $g_0[n]$ and $h_0[n]$ are the lowpass filters. For perfect reconstruction, the first term in equation (3-8), called the distortion term, should be a constant or a pure time delay. For example, $$H_0(z)G_0(z)+H_1(z)G_1(z)=2z^{-l}, \tag{3-13}$$

where l denotes a time delay.

If both equations (3-9) and (3-13) are satisfied, the output of the two-channel filter bank in FIG. 7, Two-Channel Filter Bank, is a delayed version of the input signal, that is, $$\hat{X}(z)=z^{-l}X(z). \tag{3-14}$$

However, there remains a problem computing $G_0(z)$ and $G_1(z)$ [or $H_0(z)$ and $H_0(z)$]. Once $G_0(z)$ and $G_1(z)$ are determined, the rest of the filters can be found with equation (3-10).

Equation (3-10) can be written as, $$G_1(z)=H_0(-z) \text{ and } H_1(z)=-G_0(-z).$$

Substituting it into equation (3-13) yields, $$G_0(z)H_0(z) - G_0(-z)H_0(-z) = P_0(z) - P_0(-z) = 2z^{-l}, \tag{3-15}$$

where $P_0(z)$ denotes the product of two lowpass filters, $G_0(z)$ and $H_0(z)$, that is, $$P_0(z)=G_0(z)H_0(z). \tag{3-16}$$

Equation (3-15) indicates that all odd terms of the product of two lowpass filters, $G_0(z)$ and $H_0(z)$, must be zero except for order l, where l must be odd. But, even order terms are arbitrary. These observations can be summarized by the following formula:

$$p_0[n] = \begin{cases} 0 & n \text{ odd and } n \neq l \\ 2 & n = l \\ \text{arbitrary} & n \text{ even} \end{cases} \tag{3-17}$$

This reduces the design of two-channel PR filter banks to two steps:
1. Design a filter $P_0(z)$ satisfying equation (3-17).
2. Factorize $P_0(z)$ into $G_0(z)$ and $H_0(z)$. Then use equation (3-10) to compute $G_1(z)$ and $H_1(z)$.

Two types of filters are frequently used for $P_0(z)$:
- an equiripple halfband filter (Vaidyanathan and Nguyen 1987)
- a maximum flat filter In the first filter, the halfband refers to a filter in which $\omega_s+\omega_p=\pi$, where $\omega_s$ and $\omega_p$ denote the passband and stopband frequencies, respectively, as in FIG. 11, Halfband Filter.

The second filter is the maximum flat filter with a form according to the following formula:

$$P_0(z)=(1+z^{-1})^{2p}Q(z), \tag{3-18}$$

which has 2 p zeros at $z=-1$ or $\omega=\pi$. If the order of the polynomial $Q(z)$ is limited to 2 p−2, then $Q(z)$ is unique.

The maximum flat filter here differs from the Butterworth filter. The low-frequency asymptote of the Butterworth filter is a constant, while the maximum flat filter is not.

In all cases, the product of lowpass filter $P_0(z)$ is a type I filter, that is, $$p_0[n]=p_0[N-n] N \text{ even}, \tag{3-19}$$

where N denotes the filter order. Consequently, the number of coefficients $p_0[n]$ is odd, N+1.

FIG. 12 plots the zeros distribution of a maximum flat filter $P_0(z)$ for p=3.

There are six zeros at $\omega=\pi$. In this case, the order of the unique polynomial Q(z) is four, which contributes another four zeros (not on the unit circle). If three zeros at $\omega=\pi$ go to $G_0(z)$ according to the formula, $$G_0(z)=(1+z^{-1})^3, \qquad (3\text{-}20)$$

and the rest of the zeros go to $H_0(z)$, B-spline filter banks are obtained. The coefficients of $g_0[n]$ and $g_1[n]$ and the corresponding scaling function and mother wavelet are plotted in FIG. 13, B-spline Filter Bank. Both the scaling function and mother wavelet generated by $g_0[n]$ and $g_1[n]$ are smooth.

FIG. 14 depicts the dual filter bank, $h_0[n]$ and $h_1[n]$, and corresponding scaling function and mother wavelet. One also can use $h_0[n]$ and $h_1[n]$ for analysis. In FIG. 14, the tree filter banks constituted by $h_0[n]$ and $h_1[n]$ do not converge.

It is noted that two-channel PR filter banks do not necessarily correspond to the wavelet transform. The wavelet transformations are special cases of two-channel PR filter banks. The conditions of two-channel PR filter banks are more moderate than those for the wavelet transform.

Finally, the analysis filter banks and synthesis filter banks presented in this section are orthogonal to each other. That is $$\sum_n g_i[n-2k]h_i[n] = \delta(k) \text{ and} \qquad (3\text{-}21)$$

$$\sum_n g_i[n-2k]h_l[n] = 0 \quad i \neq l, \forall k$$

The filters banks that satisfy equation (3-12) are traditionally called biorthogonal filter banks. In addition to equation (3-21), if the analysis filter banks also satisfy the following equations $$\sum_n g_i[n-2k]g_i[n] = \delta(k) \text{ and} \qquad (3\text{-}22)$$

$$\sum_n g_i[n-2k]g_l[n] = 0 \quad i \neq l, \forall k$$

the resulting filter banks are called orthogonal filter banks. Orthogonal filter banks are special cases of biorthogonal filter banks.

Orthogonal Filter Banks

As shown in the preceding section, once $P_0(z)$ is determined, the product of two lowpass filters, $P_0(z)$ must be factorized into $G_0(z)$ and $H_0(z)$. Evidently, the combinations of zeros are not unique. Different combinations lead to different filter banks. Sometimes $G_0(z)$ and $G_1(z)$ work well, but $H_0(z)$ and $H_1(z)$ might not (see FIG. 13, B-spline Filter Bank, and FIG. 14, Dual B-spline Filter Bank). One way to make this process easier is to limit the selections into a subset. The most effective approach is to require $G_0(z)$ and $G_1(z)$, and thereby $H_0(z)$ and $H_1(z)$, to be orthogonal, as described by equation (3-22).

These constraints reduce the filter banks design to one filter design. Once $G_0(z)$ is selected, one can easily find all other filters. The constraints imposed by equation (3-22) not only guarantee that both filter banks have the same performance, but also provide other advantages. For example, many applications demonstrate that the lack of orthogonality complicates quantization and bit allocation between bands, eliminating the conservation of energy. To achieve equation (3-22), let $$G_1(z)=-z^{-N}G0(-z^{-1}), \qquad (3\text{-}23)$$

which implies that $g_1[n]$ is alternating flip of $g_0[n]$, that is, $$(g_1[0],g_1[1],g_1[2],\ldots)=(g_0[N],-g_0[N-1], g_0[N-2],\ldots). \qquad (3\text{-}24)$$

Equation (3-23) implies that for orthogonal wavelets and filter banks, $$H_0(z)=z^{-N}G_0(z^{-1}), \qquad (3\text{-}25)$$

where the relation in equation (3-10) is used. Consequently, equation (3-16) can be written as, $$P_0(z)=z^{-N}G_0(z)G_0(z^{-1}). \qquad (3\text{-}26)$$

If, $$G_0(z)G_0(z^{-1})=P(z), \qquad (3\text{-}27)$$

then, $$P(e^{j\omega}) = \sum_{n=-N}^{N} p[n]e^{-j\omega n} = \left|\sum_{n=0}^{N} g_0[n]e^{-j\omega n}\right|^2, \qquad (3\text{-}28)$$

which implies that P(z) is non-negative.

Similar to biorthogonal cases, the selection of $P_0(z)$ in orthogonal cases is dominated by maximum flat and equiripple halfband filters. However, because of constraints imposed by equation (3-28), $P_0(z)$ must be the time-shifted non-negative function P(z). While the maximum flat filter in equation (3-18) ensures this requirement, special care must be taken when $P_0(z)$ is an equiripple halfband filter.

FIG. 15 plots the third order Daubechies filter banks and wavelets. It is derived from the same maximum flat filter as that depicted in FIG. 12, Zeros Distribution for $(1-z^{-1})^6 Q$ (z), but in this case, $G_0(z)$ contains three zeros at $\omega=\pi$ as well as all zeros inside of the unit circle, therefore possessing minimum phase. Because of the orthogonality, its dual filter bank has the same convergence property. Compared to the B-spline cases in FIG. 13, B-spline Filter Bank, and FIG. 14, Dual B-spline Filter Bank, the third order Daubechies wavelet and scaling function are less smooth than that of $G_0(z)$ and $G_1(z)$ (see FIG. 13, B-spline Filter Bank), but much smoother than that of $H_0(z)$ and $H_1(z)$ (see FIG. 14, Dual B-spline Filter Bank).

Two-Dimensional Signal Processing

The preceding sections introduced two-channel PR filter banks for one-dimensional (1D) signal processing. In fact, two-channel PR filter banks also can be used for two-dimensional (2D) signals as shown in FIG. 16. In this case, the rows are processed first and then columns. Consequently, one 2D array splits to the following four 2D sub-arrays:

low-low
low-high
high-low
high-high

Each sub-arrays is a quarter size of the original 2D signal.

FIG. 29, 2D Image Decomposition, illustrates 2D image decomposition by two-channel PR filter banks. In this case, the original 128-by-128 2D array is decomposed into four 64-by-64 sub-arrays, but the total size of the four sub-arrays is the same as the original 2D array. For example, the total number of elements in the four sub-arrays is 16,384, which equals 128 times 128. However, if the filters are selected properly, sub-arrays can be made such that the majority elements are small enough to be neglected. Consequently, a fraction of the entire wavelet transform coefficients can be used to recover the original image and thereby achieve data compression. In this example, the largest 25% wavelet transform coefficients are used to rebuild the original image. Among them, the majority (93.22%) are from the low-low sub-array. The remaining three sub-arrays contain limited information. If the wavelet transform is repeated to the low-low sub-array, the compression rate can be reduced further.

Selection of the Mother Wavelet

Although wavelet analysis possesses many attractive features, its numerical implementation is not as straightforward as its counterparts, such as the conventional Fourier transform and short-time Fourier transform. The difficulty arises from the following two aspects.

In order to reconstruct the original signal, the selection of the mother wavelet $\psi(t)$ is not arbitrary. Although any function can be used in (3-3), the original signal sometimes cannot be restored based on the resulting wavelet coefficients $W_{m,n}$. $\psi(t)$ is a valid or qualified wavelet only if the original signal can be reconstructed from its corresponding wavelet coefficients. The selection of the qualified wavelet is subject to certain restrictions. On the other hand, it is not unique. Unlike the case of conventional Fourier transform, in which the basis functions must be complex sinusoidal functions, one can select from an infinite number of mother wavelet functions. Therefore, the biggest issue of applying wavelet analysis is how to choose a desired mother wavelet $\psi(t)$. It is generally agreed that the success of the application of wavelet transform hinges on the selection of a proper wavelet function.

Because the scale factor m could go from negative infinity to positive infinity, it is impossible to make the time index of the wavelet function, $2^m(t-n2^{-m})$, an integer number simply by digitizing t as $i\Delta_t$, where $\Delta_t$ denotes the time sampling interval. This problem prohibits us from using digital computers to evaluate wavelet transform.

Fortunately researchers discovered a relationship between the wavelet transform and the perfect reconstruction filter bank, a form of digital filter banks. The wavelet transform can be implemented with specific types of digital filter banks known as two-channel perfect reconstruction filter banks.

Currently there is a very limited number of available mother wavelets used for wavelet analysis. Applicant is aware that MatLab program from MathWorks which was released in July 1996?, includes a graphical method for choosing a mother wavelet. However, the Matlab program only allows the user to choose from pre-configured wavelets, and does not allow a user to design a new mother wavelet which is optimum for the user's application.

Therefore, a system and method is desired for designing a mother wavelet for use in wavelet analysis. A system and method is also desired which provides an intuitive graphical interface for designing the mother wavelet.

SUMMARY OF THE INVENTION

The present invention comprises a system and method for graphically designing a mother wavelet. The system and method thus enables the user to interactively design a mother wavelet for a desired test signal or application using graphical design techniques. The present invention allows a user to arbitrarily design new mother wavelets in real time using an improved graphical user interface.

The system and method first selects a filter P(z) in response to user input, wherein a mother wavelet is associated with the filter P(z). Selecting the type of filter P(z) comprises selecting an orthogonal type or biorthogonal type of filter, as well as selecting either a maximum flat type of filter or equiripple type of filter. When a maximum flat type of filter is selected, the user can further select a number of zero pairs at $\pi$ in response to user input. When an equiripple type of filter is selected, the user further can select a number of taps parameter in response to user input, wherein the number of taps parameter determines a number of coefficients of P(z). The user then preferably sets a normalized passband frequency, wherein the normalized passband frequency determines a normalized cutoff frequency of P(z).

The filter P(z) is a product of two low pass filters $G_0(z)$ and $H_0(z)$. The filters $G_0(z)$ and $H_0(z)$ preferably collectively comprise a perfect reconstruction filter bank, wherein two or more of the filter banks can be cascaded to form a tree of filter banks, wherein the mother wavelet is produced by an output of the tree of filter banks when an impulse response is applied to an input of the tree of filter banks.

The method then displays on the screen a plot which illustrates a zeros distribution of $G_0(z)$ and $H_0(z)$. The method preferably displays a plurality of objects in the plot in locations corresponding to locations of the zeros, wherein each object represents one of the plurality of zeros. Objects corresponding to a first one or more zeros in the function $G_0(z)$ are displayed with a first color and/or shape, and objects corresponding to a second one or more zeros in the function $H_0(z)$ are displayed with a second color and/or shape.

The system and method then preferably displays the mother wavelet function which is associated with the filter P(z), as well as other desired information, such as a correlation of the test signal with one or more scaled versions of the mother wavelet and a frequency response of at least one of the filters $G_0(z)$ and $H_0(z)$.

The user can then adjust the zeros distribution of P(z), i.e, adjust the zeros distribution of $G_0(z)$ and $H_0(z)$, on the plot in order to obtain the desired mother wavelet. In other words, the system adjusts the zeros distribution of $G_0(z)$ and $H_0(z)$ on the plot in response to user input, preferably by the user graphically manipulating the zeros distribution of $G_0(z)$ and $H_0(z)$ on the plot. According to one aspect of the present invention, the operation of adjusting the zeros distribution of P(z) comprises factorizing P(z) into $G_0(z)$ and $H_0(z)$, wherein the factorizing includes assigning one or more of the zeros illustrated in the plot to the functions $G_0(z)$ and $H_0(z)$ in response to user input. The operation of factorizing P(z) into $G_0(z)$ and $H_0(z)$ in order to design a mother wavelet is one novel aspect of the present invention. The assigning operates to determine the functions $G_0(z)$ and $H_0(z)$, wherein the functions $G_0(z)$ and $H_0(z)$ determine a filter bank, and wherein the filter bank determines the mother wavelet for the test signal.

The operation of adjusting the zeros distribution of $G_0(z)$ and $H_0(z)$ operates to automatically adjust one or more of the mother wavelet, the correlation, and the frequency response which are displayed on the screen. This operates to indicate performance of the mother wavelet. In other words, as the user adjusts the zeros distribution of $G_0(z)$ and $H_0(z)$ one or more times, various information regarding the mother wavelet, and preferably the mother wavelet itself, are updated in real time to provide a visual indication or visual feedback to the user as to the operation of the mother wavelet. This enables the user to select the optimum choice for the mother wavelet The desired mother wavelet is then useable to process the test signal. In other words, the mother wavelet is useable to analyze and/or represent the test signal. For example, the mother wavelet can be used for various types of processing of the test signal, including image compression, etc. After the mother wavelet has been determined, the user can then test the mother wavelet, such as by displaying on the screen a correlation of one or more scaled versions of the mother wavelet with the test signal on the data test panel.

The present invention thus allows the user a large range of choices in arbitrarily designing a mother wavelet. In other words, the present invention is not limited by a pre-selected or pre-stored well-known wavelets, but rather the present invention allows the user to construct new wavelets in real time using an improved graphical user interface. Further, the present invention factorizes $P(z)$ into $G_0(z)$ and $H_0(z)$, wherein the user can then assign one or more of the zeros illustrated in the plot to the functions $G_0(z)$ and $H_0(z)$ to design the mother wavelet.

BRIEF DESCRIPTION OF THE DRAWINGS

A better understanding of the invention can be obtained when the following detailed description of the preferred embodiment can be considered in conjunction with the following drawings, in which:

FIG. 21 illustrates a filter comparison which summarizes important filter combinations;

FIGS. 34a–d illustrate the present invention used to detect a discontinuity, wherein FIG. 34a illustrates the design panel, FIG. 34b illustrates the wavelets and filters, and FIGS. 34c and 34d illustrate 1D test panels; and FIGS. 35a–d illustrate the present invention used for signal separation, wherein FIG. 35a illustrates the design panel, FIG. 35b illustrates the wavelets and filters, and FIGS. 35c and 35d illustrate 1D test panels.

DETAILED DESCRIPTION OF THE PREFERRED EMBODIMENT

Figure 17:
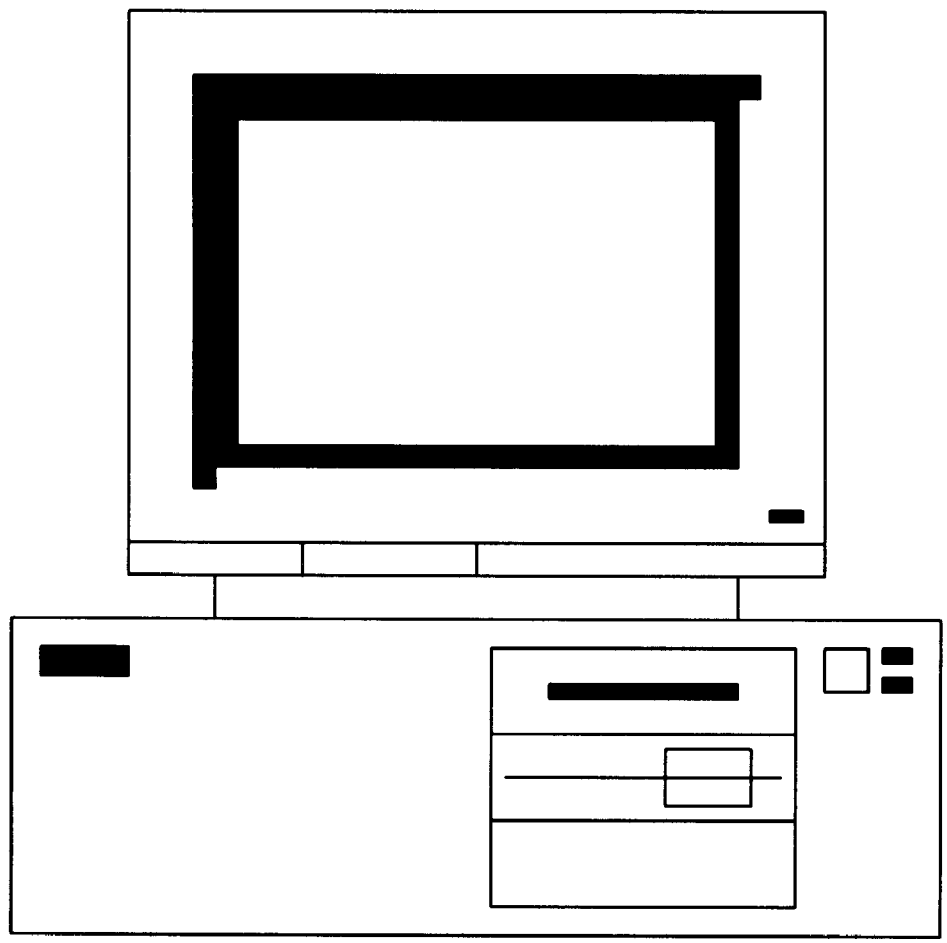
FIG. 17 illustrates a computer system which implements the system and method of the present invention, and which includes a memory media that stores program instructions according to the present invention.

Referring now to FIG. 17, a computer system is shown which is useable to design a mother wavelet according to the present invention. The computer system includes various standard components, including a display screen, a user input device, such as a mouse or keyboard, memory, CPU, etc. The present invention preferably comprises a method executed by the computer system which enables a user to design a mother wavelet with an improved graphical user interface.

The present invention also includes a memory media comprised in the computer system which stores software or program instructions which are executable by the computer to implement the above method. The memory media may be any of various types, including system memory, such as DRAM, SRAM, EDO RAM, etc., non-volatile memory such as a hard disk or optical storage, and installation media such as a CD-ROM, floppy disks, etc.

Wavelet Design System and Method of the Present Invention

Figure 18A:
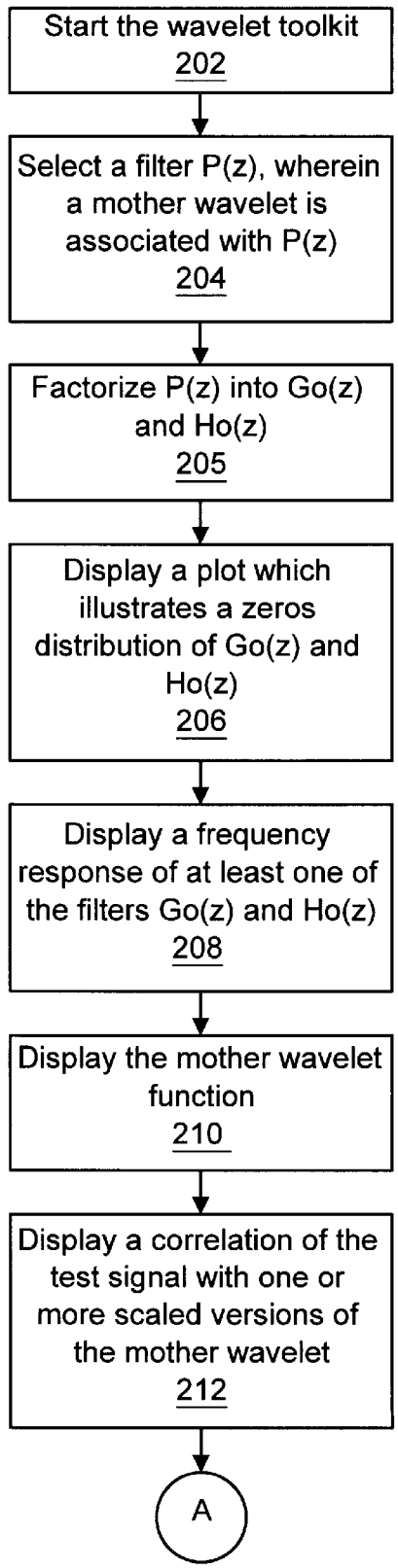
FIGS. 18A and 18B are a flowchart illustrating operation of the method of designing a mother wavelet according to the present invention.
Figure 18B:
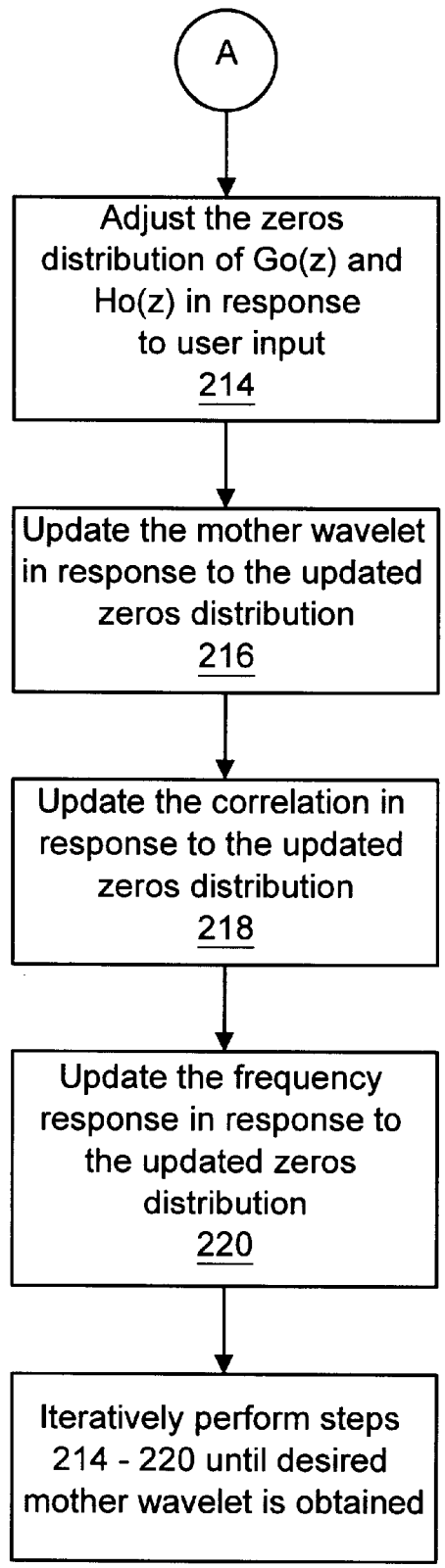

Referring now to FIG. 18, a flowchart diagram illustrating operation of the present invention is shown. As shown, in step 202 the user starts the wavelet toolkit of the present invention. The wavelet toolkit comprises a method for designing a mother wavelet for a test signal on a computer system, wherein the mother wavelet is usable to process the test signal. As described above, the computer system includes a display screen and a user input device. It is noted that the steps described below can occur concurrently or in different orders.

In step 204 the method selects a filter $P(z)$ in response to user input, wherein a mother wavelet is associated with the filter $P(z)$. Selecting the type of filter $P(z)$ comprises selecting an orthogonal type or biorthogonal type of filter, as well as selecting either a maximum flat type of filter or equiripple type of filter. When a maximum flat type of filter is selected, the user can further select a number of zero pairs at pi in response to user input. When an equiripple type of filter is selected, the user further can select a number of taps parameter in response to user input, wherein the number of taps parameter determines a number of coefficients of $P(z)$. The user then preferably sets a normalized passband frequency, wherein the normalized pass-band frequency determines a normalized cutoff frequency of $P(z)$.

Figure 22A:
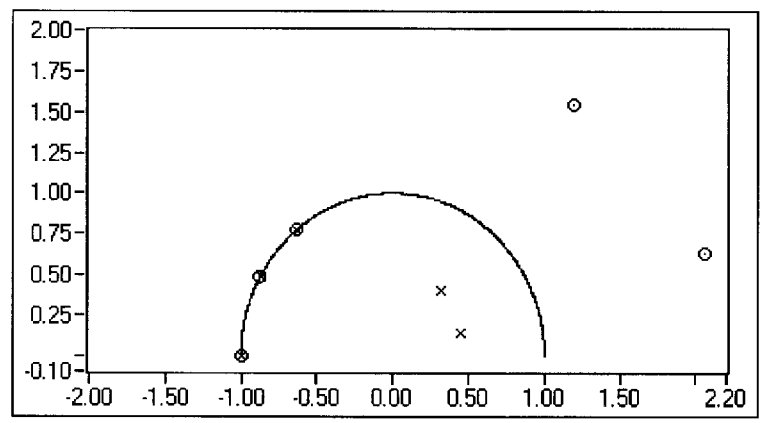
FIG. 22A illustrates the zeros distribution for a minimum phase filter.
Figure 22B:
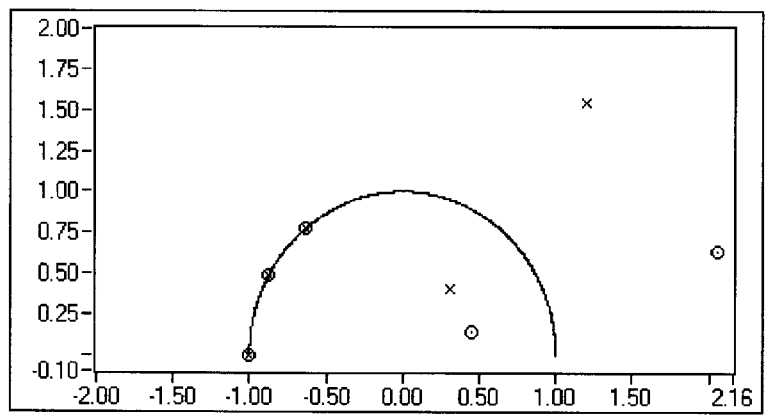
FIG. 22B illustrates the zeros distribution for a linear phase filter.
Figure 22C:
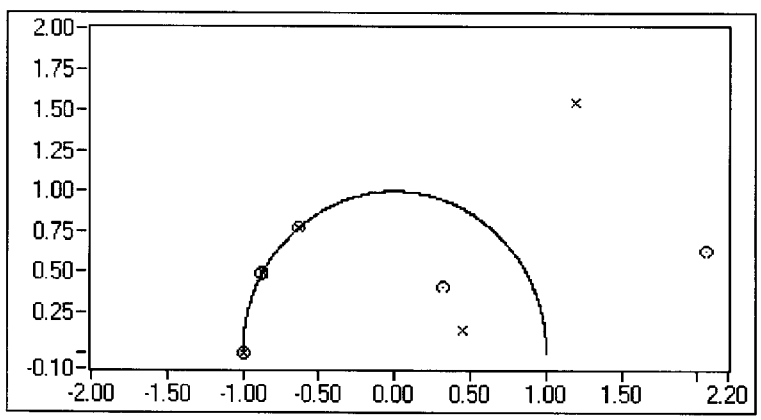
FIG. 22C illustrates the zeros distribution for an orthogonal filter.

In step 205 the method factorizes $P(z)$ into $G_0(z)$ and $H_0(z)$. The filter $P(z)$ is a product of two low pass filters $G_0(z)$ and $H_0(z)$. For example, FIGS. 22(a)–22(c) illustrate various types of filters. The filters $G_0(z)$ and $H_0(z)$ collectively comprise a perfect reconstruction filter bank, wherein two or more of the filter banks can be cascaded to form a tree of filter banks, wherein the mother wavelet is produced by an output of the tree of filter banks when an impulse response is applied to an input of the tree of filter banks.

In step 206 the method displays on the screen a plot which illustrates a zeros distribution of $G_0(z)$ and $H_0(z)$. Examples of the filters $G_0(z)$ and $H_0(z)$ are shown in FIGS. 22a–22c. For example, FIG. 22a illustrates a plot for a minimum phase filter, FIG. 22b illustrates a plot for a linear phase filter, and FIG. 22c illustrates a plot for an orthogonal filter. In the preferred embodiment, the system only displays the upper half of the plot. In step 206 the method preferably displays a plurality of objects in the plot in locations corresponding to locations of the zeros, wherein each object represents one of the plurality of zeros. Objects corresponding to a first one or more zeros in the function $G_0(z)$ are displayed with a first color and/or shape, and objects corresponding to a second one or more zeros in the function $H_0(z)$ are displayed with a second color and/or shape.

In step 208 the system displays a frequency response of at least one of the filters $G_0(z)$ and $H_0(z)$. The frequency response of at least one of the filters $G_0(z)$ and $H_0(z)$ is shown as the analysis lowpass and synthesis lowpass diagrams in the screen shot of FIG. 30.

Figure 30:
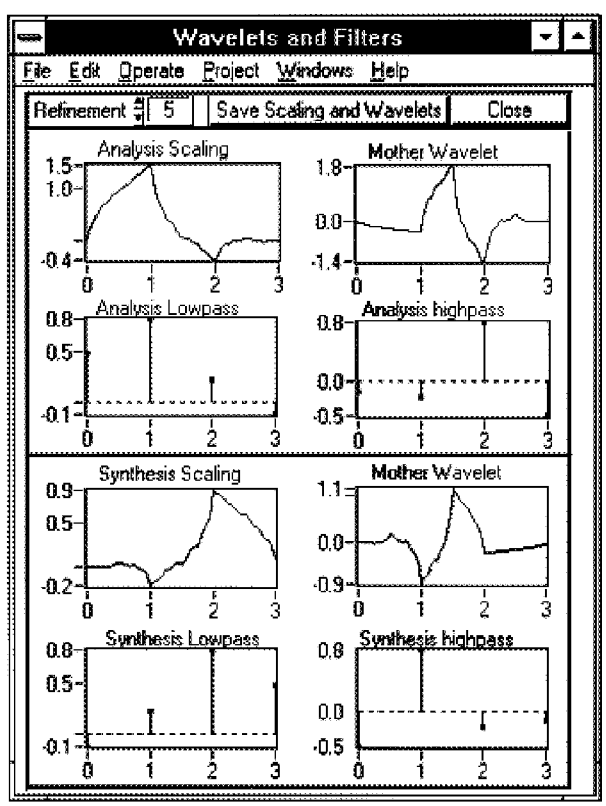
FIG. 30 illustrates the wavelets and filters panel, which displays the mother wavelet and scaling functions, as well as the filter coefficients $G_0(z)$, $G_1(z)$, $H_0(z)$ and $H_1(z)$.

In step 210 the system preferably displays the mother wavelet function which is associated with the filter $P(z)$, i.e., with the two filters $G_0(z)$ and $H_0(z)$. The screen shot of FIG. 30 illustrates the mother wavelet.

In step 212 the system can also display a correlation of the test signal with one or more scaled versions of the mother wavelet. The screen shot of FIG. 30 illustrates correlation of the test signal with one or more scaled versions of the mother wavelet. Step 212 preferably involves the method selecting a scale of the mother wavelet in response to user input, wherein the correlation of the test signal with one or more scaled versions of the mother wavelet is displayed for the selected scale of the mother wavelet.

Figure 23:
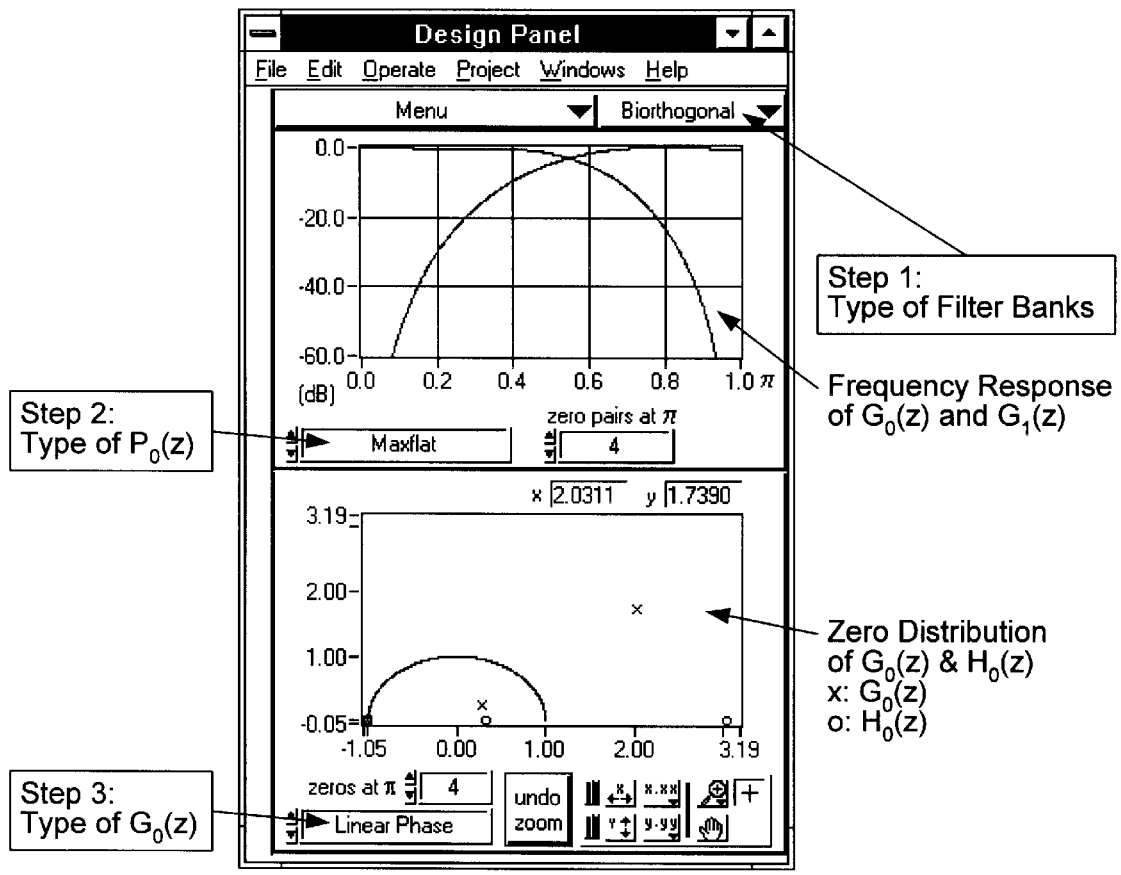
FIG. 23 illustrates a design panel used for designing a mother wavelet according to the preferred embodiment of the invention.

It is noted that any one or more of the plots referenced in steps 204–212 can be displayed, as desired. In other words, any one or more of the steps 204–212 can be performed, i.e., certain one or more of these steps can not be performed. Thus, the user can select the information desired to be displayed, such as the filter $P(z)$, the zeros distribution plot, the mother wavelet function, the correlation of the test signal with one or more scaled versions of the mother wavelet, and/or the frequency response of one of the filters. Also, the information displayed in steps 204–212 is preferably displayed in one or more panels, as shown in FIGS. 23 and 30.

In step 214 the system adjusts the zeros distribution of $G_0(z)$ and $H_0(z)$ on the plot in response to user input. Adjusting the zeros distribution comprises the user graphically manipulating the zeros distribution of $G_0(z)$ and $H_0(z)$ on the plot, i.e., the system graphically manipulating the zeros distribution of $G_0(z)$ and $H_0(z)$ on the plot in response to user input. In other words, step 214 involves adjusting the zeros distribution of $P(z)$, wherein this adjusting comprises factorizing $P(z)$ into $G_0(z)$ and $H_0(z)$, wherein the factorizing includes assigning one or more of the zeros illustrated in the plot to the functions $G_0(z)$ and $H_0(z)$ in response to user input. The assigning operates to determine the functions $G_0(z)$ and $H_0(z)$, wherein the functions $G_0(z)$ and $H_0(z)$ determine a filter bank, and wherein the filter bank determines the mother wavelet for the test signal. The assigning comprises graphically manipulating at least one of the one or more zeros illustrated in the plot in response to user input to assign at least one of the one or more of the zeros illustrated in the plot to the functions $G_0(z)$ and $H_0(z)$.

The operation of assigning zeros includes selecting at least one of the plurality of zeros and assigning the selected one of the plurality of zeros to one of either the function $G_0(z)$ or the function $H_0(z)$ in response to user input. In the preferred embodiment, displaying on the screen the plot which illustrates a zeros distribution of $G_0(z)$ and $H_0(z)$ comprises displaying a plurality of zeros comprised in the plot, wherein at least a subset of the plurality of zeros is initially assigned to one of either the function $G_0(z)$ or the function $H_0(z)$. Thus the step of assigning includes selecting a first zero of the plurality of zeros, wherein the first zero is initially assigned to to one of either the function $G_0(z)$ or the function $H_0(z)$, and assigning the first zero to the other of the function $G_0(z)$ or the function $H_0(z)$ in response to user input. This is preferably performed by the user selecting a zero with the mouse and then left clicking to change the zero from one function to the other.

Figure 20:
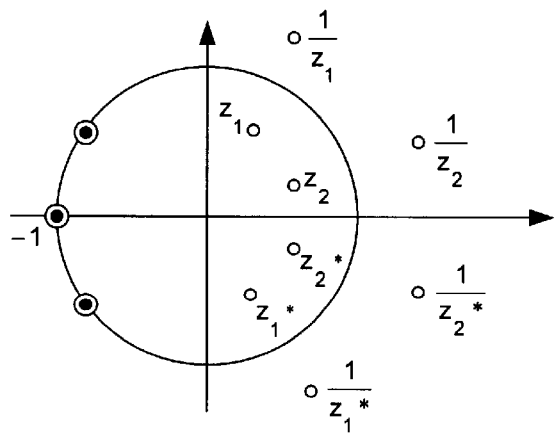
FIG. 20 illustrates a non-negative equiripple halfband filter showing symmetry of zeros in the z plane.

As shown in FIG. 20, each zero includes a reciprocal, i.e., each zero above the x-axis includes a zero below the x-axis. The step of factorizing $P(z)$ into $G_0(z)$ and $H_0(z)$ preferably includes selecting a zero assignment constraint in response to user input. The different types of zero assignment constraints include linear phase, minimum phase, B-Spline, or arbitrary. The step of assigning one or more of the zeros illustrated in the plot to the functions $G_0(z)$ and $H_0(z)$ includes automatically assigning the reciprocal of the one or more of the zeros to one of the functions $G_0(z)$ and $H_0(z)$ based on the selected zero assignment constraint.

The operation of adjusting the zeros distribution of $G_0(z)$ and $H_0(z)$ operates to automatically adjust the mother wavelet in step 216, operates to automatically adjust the correlation in step 218, and operates to automatically adjust the frequency response in step 220. Steps 216–220 of updating and displaying the mother wavelet, correlation, and frequency response as the zeros distribution of $G_0(z)$ and $H_0(z)$ on the plot is adjusted operate to indicate performance of the mother wavelet. In other words, as the user adjusts the zeros distribution of $G_0(z)$ and $H_0(z)$, various information regarding the mother wavelet, and preferably the mother wavelet itself, are updated in real time to provide a visual indication or visual feedback to the user as to the operation of the mother wavelet. This enables the user to optimally design the mother wavelet.

It is noted that only the information that is currently being displayed, such as one or more of the mother wavelet, correlation, or frequency response are preferably adjusted and displayed in response to the updated zeros distribution.

The operation of adjusting the zeros distribution of $G_0(z)$ and $H_0(z)$ on the plot in step 214, as well as the updating steps 216–220, are performed one or more times until a desired mother wavelet is obtained. Thus the user can iteratively adjust the zeros plot until the desired mother wavelet having the desired characteristics are obtained. Thus, it is noted that each of the items that are displayed in steps 204–212 are displayed and updated in real time in response to the user adjusting the zeros distribution of the filters $G_0(z)$ and $H_0(z)$. These items are preferably updated after each adjustment of the zeros distribution of $G_0(z)$ and $H_0(z)$.

Once the desired mother wavelet is obtained, the mother wavelet is then useable to process the test signal. In other words, the mother wavelet is useable to analyze and/or represent the test signal. For example, the mother wavelet can be used for various types of processing of the test signal, including image compression, etc.

After the mother wavelet has been determined by repeating steps 214–220 one or more times, the user can then test the mother wavelet. Testing the mother wavelet comprises displaying on the screen a data test panel after the desired mother wavelet is obtained. The desired mother wavelet can then be tested, wherein the testing includes displaying on the screen correlation of one or more scaled versions of the mother wavelet with the test signal on the data test panel.

The following description describes the architecture of the wavelet design toolkit of the preferred embodiment and more fully discusses the flowchart of FIG. 18 described above. The wavelet design toolkit of the preferred embodiment is preferably sold as the WFBD Toolkit from National Instruments Corporation, and is referred to below as the WFBD Toolkit.

Wavelet and Filter Bank Design

Figure 19:
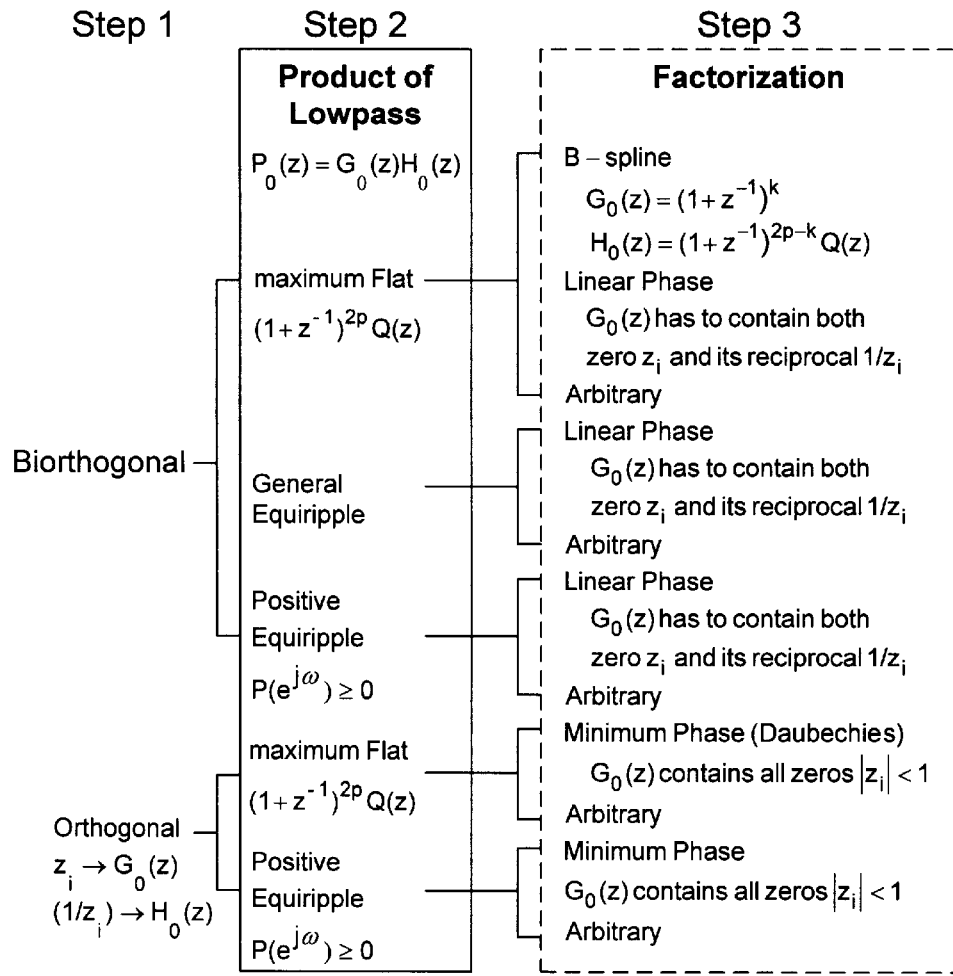
FIG. 19 illustrates a design procedure for wavelets and filter banks according to the preferred embodiment.

FIG. 19, Design Procedure for Wavelets and Filter Banks, lists the choices of wavelets and filter banks available in the WFBD Toolkit. The design of wavelets and filter banks includes three steps.

1. Determine the type of wavelet and filter banks-orthogonal or biorthogonal.
2. Select the type of filters based on the product $P_0(z)$ of the two lowpass filters, $G_0(z)$ and $H_0(z)$.
3. Factorize $P_0(z)$ into $G_0(z)$ and $H_0(z)$.Because all filters in the WFBD Toolkit act as real-valued FIR filters, the zeros of $P_0(z)$, $G_0(z)$, and $H_0(z)$ are symmetrical in the z-plane. This implies that for any zero $z_i$, there always exists $z_i^*$, if $z_i$ is complex, as shown in FIG. 20. Hence, only half of the z-plane is required. Once $z_i$ is selected, the program automatically includes its complex conjugate $z_i^*$.

For both orthogonal and biorthogonal wavelets and filter banks, either maximum flat or equiripple filters can be used for the product of lowpass filters $P_0(z)$. The maximum flat filters have good frequency attenuation, but wider transition band. Because the filter has the form $$P_0(z) = (1+z^{-1})^{2p} Q(z),$$

a large number of zeros can be imposed at $\omega = it$. On the other hand, the halfband equiripple filters only can have a pair of zeros at $\omega = \pi$, which gives the equiripple type filters slower convergence rates. However, it is easier to balance the frequency attenuation and transition band for an equiripple filter. For a given transition band, the attenuation is proportional to the filter order of $P_0(z)$. The larger the order, the better the attenuation.

Once $P_0(z)$ is determined, it must be factorized into the lowpass filters, $G_0(z)$ and $H_0(z)$. The combination of zeros is not unique. FIG. 21, Filter Comparison, summarizes some important filter combinations, while FIGS. 22a–22c plot the zeros distribution.

It is noted that the conditions for linear phase and orthogonality are contradictory. In general, linear phase and orthogonality cannot be achieved simultaneously.

In the preferred embodiment, the LabVIEW program is used with the WFBD toolkit. LabVIEW is a software program available from National Instruments. If LabVIEW is used with the WFBD Toolkit, then the user designs wavelets and filter banks by using the Design Panel. To access the Design Panel, the user opens WaveMain.11b in the WFBD Toolkit program and clicks on Design Panel. This VI opens the panel shown in FIG. 23. If the user does not have LabVIEW, the user runs wfbd. exe in the WFBD Toolkit program. The first panel to appear is the Design Panel. The Design Panel is used to complete the three steps in designing wavelets and filter banks.

The steps in designing wavelets and filter banks can be summarized as follows:

1. Select the type of filter bank.

The user can select from two types of wavelets and filter banks, orthogonal and biorthogonal. Orthogonal filters and wavelets can be designed easily because they involve fewer parameters, but the filter banks cannot be linear phase.

2. Find the product $P_0(z)$.

$P_0(z)$ denotes the product of $G_0(z)$ and $H_0(z)$, that is, $P_0(z) = G_0(z) H_0(z)$.

In the WFBD Toolkit, G denotes an analysis filter and H denotes a synthesis filter. The subscript 0 denotes a lowpass filter and 1 denotes a highpass filter.

In orthogonal filter banks, $P_0(z)$ can be either maximum flat or positive equiripple.

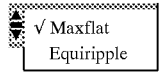

In biorthogonal filter banks, $P_0(z)$ can be maximum flat, general equiripple, or positive equiripple.

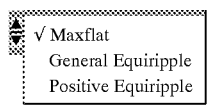

The maximum flat filter differs from the Butterworth filter. It has a form, $$P_0(z)=(1+z^{-1})^{2p}Z(z). \tag{3-29}$$

The parameter p is controlled by the button zero pairs at π. Q(z) is a 2 p−2 order polynomial, which can be uniquely determine if p is decided. Therefore, the total number of coefficients of $P_0(z)$ is 4 p−1.

Figure 24:
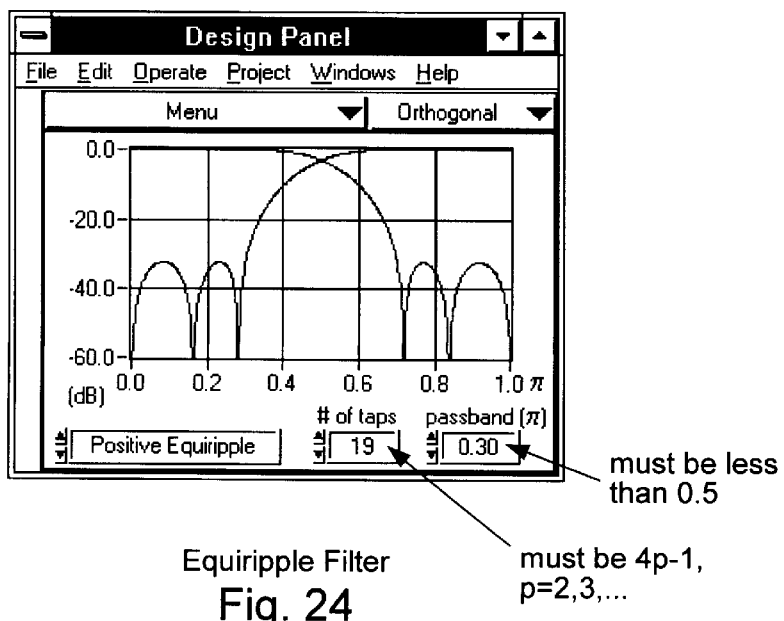
FIG. 24 illustrates a portion of the design panel showing an equiripple filter.

The equiripple is further divided into the general equiripple and positive equiripple filters; however, the user only can select general equiripple filters for biorthogonal filter banks. Although both are halfband filters, that is, the sum of the normalized passband and stopband frequencies equals 0.5, the Fourier transform of the positive equiripple filter $p_0[n]$ is always real and non-negative. There are two parameters associated with equiripple filters, the # of taps and normalized passband frequency as illustrated in FIG. 24.

# of taps—Number of coefficients of $P_0(z)$. Because $P_0(z)$ is a type I FIR filter, the length of $P_0(z)$ must be 4 p−1, where p=2,3, . . .

passband—Normalized cutoff frequency of $P_0(z)$, which must be less than 0.5. Once the product of lowpass filters $P_0(z)$ is determined, the user must factorize $P_0(z)$ into $G_0(z)$ and $H_0(z)$.

3. Factorize $P_0(z)$ into $G_0(z)$ and $H_0(z)$.

The plot in the lower half of the Design Panel in FIG. 23 displays the zeros distribution of $P_0(z)$. Because all the zeros are symmetrical with respect to x-axis, only the upper half of the plane is displayed. The selection of $G_0(z)$ and $H_0(z)$ is to group different zeros. The blue circle represents the zeros in $G_0(z)$ and the red cross represents the zeros in $H_0(z)$.

To select a zero, the user places the cursor on the zero desired to be chosen and clicks the left mouse button. This switches the zeros from $G_0(z)$ to $H_0(z)$, and vice versa. All the zeros go to either $G_0(z)$ or $H_0(z)$. The plot in the upper half of the panel displays the frequency response of filters $G_0(z)$ and $G_1(z)$. $G_1(z)$ is the sign-alternated version of $H_0(z)$. Therefore, $G_1(z)$ must be a highpass filter if $H_0(z)$ is a lowpass filter.

If two zeros are too close to choose, the user uses the Zoom Tool palette, located in the lower right corner of the Design Panel to zoom in on these zeros until these zeros can be identified. For maximum flat filters, there are multiple zeros at z=0. The user uses the zeros at π button to control how many zeros at z=0 go to $G_0(z)$.

For the given $P_0(z)$, the user has four choices for $G_0(z)$ and $H_0(z)$.

Linear Phase—Any zero and its reciprocal must belong to the same filter.

Minimum Phase—$G_0(z)$ contains all the zeros inside the unit circle. When $P_0(z)$ is maximum flat and $G_0(z)$ is minimum phase, the resulting wavelets are traditionally named Daubechies wavelets.

B-Spline-Only available when the filter is biorthogonal and maximum flat. In this case, $$G_0(z)=(1+z^{-1})^k \; H_0(z)=(1+z^{-1})^{2\,p-k}Q(z),$$

where k is decided by the button, zeros at π. p is decided by the button, zero pairs at π, as mentioned earlier.

Arbitrary—No specific constraints.

Once the user decides the type of $G_0(z)$ and $H_0(z)$, the program automatically computes the constraints. For example, once the user selects a zero, its reciprocal automatically is included if the user chooses $G_0(z)$ for linear phase. All possible design combinations provided by this panel are summarized in FIG. 19, Design Procedure for Wavelets and Filter Banks.

Figure 25:
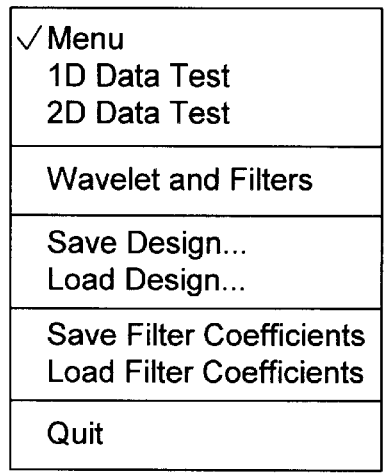
FIG. 25 illustrates a menu ring for accessing utilities from the design panel.

The Design Panel also provides other utilities. The user can access these utilities from the Menu ring, shown in FIG. 25.

1D Data Test—Invokes the 1D_Test panel. Use this panel to examine the performance of the wavelet and filter bank designed with the Design Panel.

2D Data Test—Invokes the 2D_Test panel. Use this panel to test the wavelet and filter bank designed for a two-dimensional image.

Wavelet and Filters—Invokes the Wavelets and Filters panel. Use this panel to display the mother wavelet, scaling functions, and the filter coefficients.

Save Design . . .—Saves the design information in a binary file.

Load Design . . .—Loads a saved design information file.

Save Filter Coefficients—Saves the designed analysis filter coefficients and synthesis filter coefficients in a text file.

Show Filter Coefficients—Displays a table listing the designed analysis and synthesis filter coefficients.

The 1D Data Test, 2D Data Test, and Wavelet and Filters menu options access other panels, described in the remaining sections of this chapter.

One-Dimensional Data Test

Figure 26:
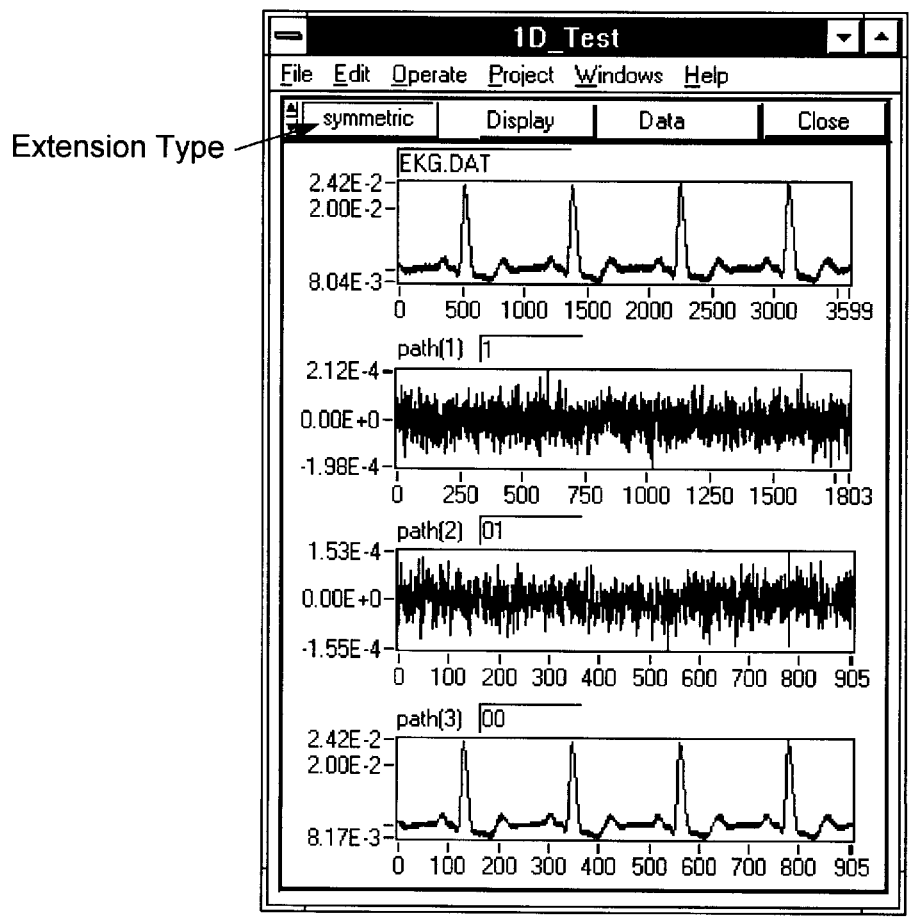
FIG. 26 illustrates a 1 dimensional (1D) test panel for testing the designed wavelet and filter bank for 1D data.

The 1D_Test panel is shown in FIG. 26. The user accesses this panel by selecting 1D Data Test from the Menu ring of the Design Panel. The user uses this panel to test the designed wavelet and filter bank for 1D data.

Extension Type—Determines the padding method for the data.

Zero Padding—Adds zeros at the beginning and end of the original data.

Symmetric Extension—Symmetrically adds the input data at the beginning and end of the original data.

In both cases, the user can add the number of points at the beginning and end of the original data with the following formula:

$$\frac{N_p - 1}{2} = \frac{N_g + N_h}{2} - 1$$

where $N_p$ is the number of coefficients of $P_0(z)$, $N_g$ is the number of coefficients of filter $G_0(z)$, and $N_h$ is the number of coefficients of filter $H_0(z)$.

Display—Displays either a time waveform or a histogram.

Data—Provides the following choices: Data, Read from File, DAQ Setup, Acquire Data.

Read from file—Reads one-dimensional input data from a text file.

Acquire Data—Uses the data acquisition board specified in the DAQ Setup panel to acquire a block of data and then analyze it. The user must run the DAQ Setup panel before acquiring any data.

Figure 27:
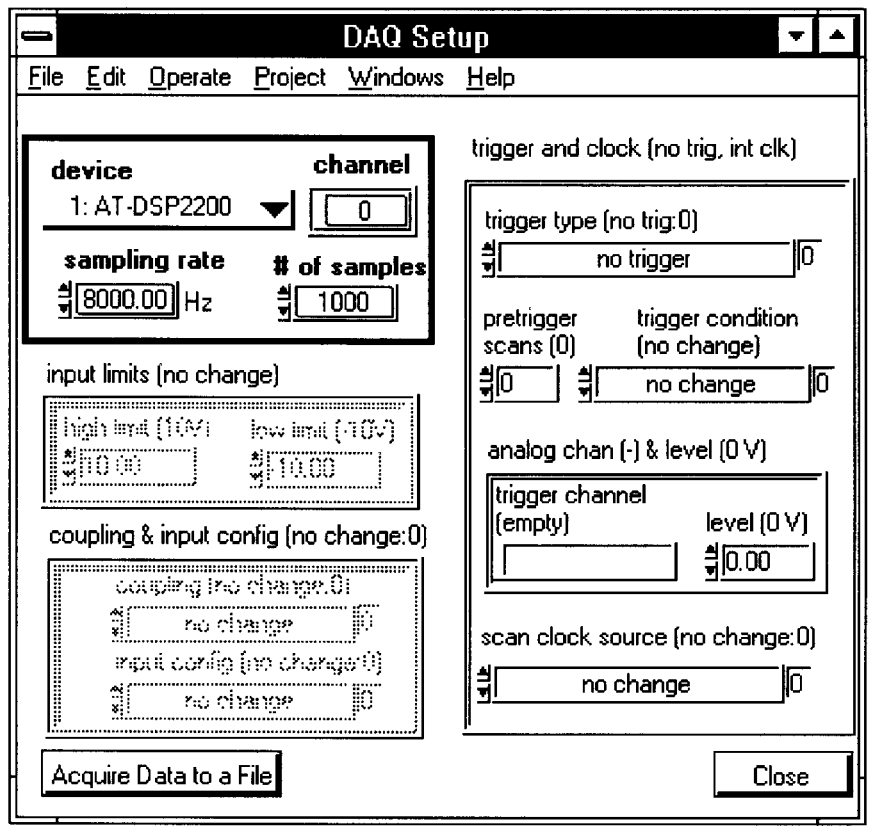
FIG. 27 illustrates a DAQ setup panel for configuring a data acquisition board.

DAQ Setup—Invokes the DAQ Setup panel, shown in FIG. 27, DAQ Setup Panel. The user uses this panel to configure his data acquisition board.

Usually, the user only needs to configure the following parameters:

device—Indicates which DAQ board the user is using to acquire data.

channel—Indicates which channel on the DAQ board the user is using to acquire data. Only one channel can be specified.

sampling rate—Indicates how fast the user samples his data.

# of samples—Indicates how many samples to acquire.

Acquire Data to a File—Acquires a block of data and saves it to a text file.

The remaining parameters on the DAQ Setup panel are for advanced data acquisition users. For more information on these parameters, please see the corresponding DAQ manual from National Instruments Corporation path—Specifies a path for the output for that plot. The user can type in any path. While 0 represents passing a lowpass filter $G_0(z)$, 1 represents passing a highpass filter $G_1(z)$. An example of this is demonstrated in FIG. 28.

Two-Dimensional Data Test

Figure 29:
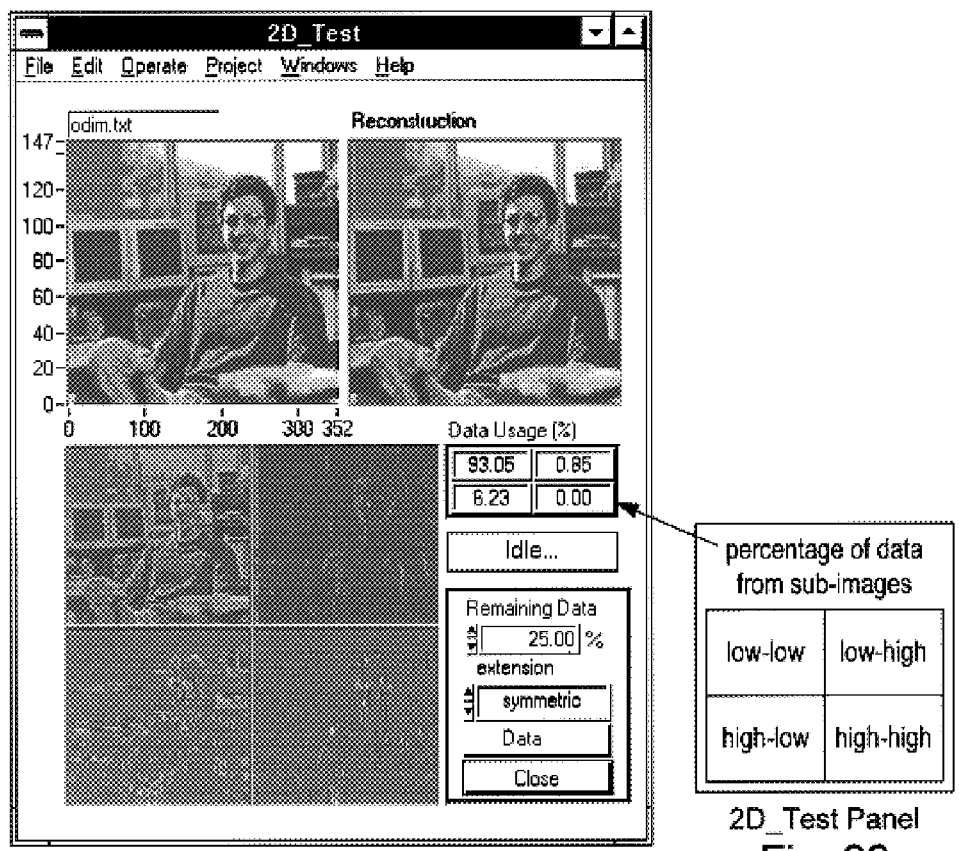
FIG. 29 illustrates a 2 dimensional (2D) test panel for testing the designed wavelet and filter bank for 2D data.

The 2D_Test panel is shown in FIG. 29. The user accesses this panel by selecting 2D Data Test from the Menu ring of the Design Panel. The user can use this panel to test the designed wavelet and filter banks for a 2D image.

As introduced above, by applying the wavelet transform, one image is broken into four subimages. The four subimages are arranged as shown in the right portion of FIG. 29.

Referring now to FIG. 29, the various fields in the 2D test panel are described.

Figure 28:
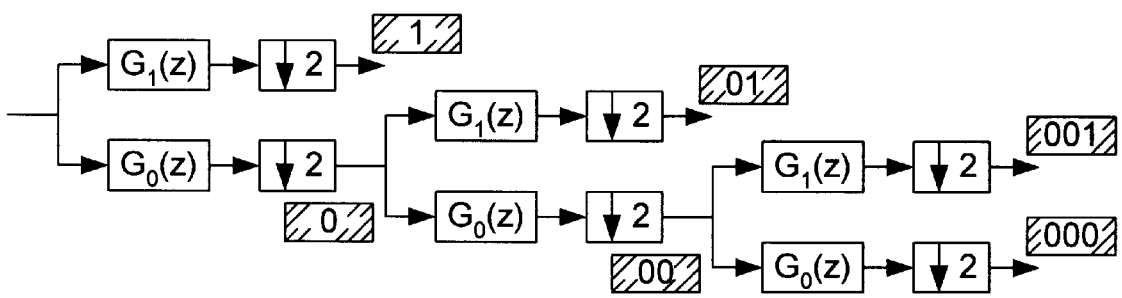
FIG. 28 illustrates operation of specifying a path for the output of a plot.

Data Usage (%)—Displays the percentage of the wavelet coefficients from each of the subimages used to restore the image. In FIG. 28, the original image size is 353 times 148, or 52,244 data samples. The reconstruction uses 25% of the largest wavelet transform coefficients, that is, 25% of 52,244 or 13,061 samples. Among these samples, 93.05% are from the low-low subimage (12,147 coefficients), 6.23% are from the low-high subimage (814 coefficients), and 0.85% are from the high-low subimage (111 coefficients). None are from the high-high subimage.

Remaining Data—Displays the user's choice for the percentage of the largest data from the four subimages, which is used for the reconstruction.

extension—Determines the padding method for the data.

Zero Padding—Adds zeros at the beginning and end of the original data.

symmetric extension-Symmetrically adds the input data at the beginning and end of the original data.

In both cases, the number of points added at the beginning and the end of the original data are found by the following formula:

$$\frac{N_p - 1}{2} = \frac{N_g + N_h}{2} - 1$$

where $N_p$ is the number of coefficients of $P_0(z)$, $N_g$ is the number of coefficients of filter $G_0(z)$, and $N_h$ is the number of coefficients of filter $H_0(z)$.

Data—Reads a 2D spreadsheet text file or stand image file, such as a .TIF or .BMP file. Be sure to choose the correct data type when reading the data file.

Wavelets and Filters

As illustrated in FIG. 30, Wavelets and Filters, the Wavelets and Filters panel displays the mother wavelet and scaling functions, as well as the filter coefficients, $G_0(z)$, $G_1(z)$, $H_0(z)$, and $H_1(z)$. The user accesses this panel by selecting Wavelet and Filters from the Menu ring of the Design Panel. Filter banks do not always converge to a wavelet function. This panel helps the user examine whether the filter bank the user has selected converges. The panel in FIG. 30 includes "Refinement" and "Save Scaling and Wavelets" options Refinement—Defines how many levels to go through to compute the wavelet and scaling function. A proper wavelet usually converges after 4 or 5 levels.

Save Scaling and Wavelets—Saves the scaling functions and wavelets for the analysis and synthesis filters in a text file.

Create User Specific Applications

The user can save all design results as text files for use in other applications. Moreover, the WFBD Toolkit includes three LabVIEW VI libraries, WaveMain.11b, Wavesubs.11b, and Wavemisc.11b, for LabVIEW users. These three libraries contain the basic wavelet analysis VIs, such as 1D and 2D analysis and synthesis filters, as well as many other useful functions. For more information regarding these VIs, refer to the WFBD Toolkit reference manual, available from National Instruments, which is hereby incorporated by reference. Consequently, the user can test the design not only with the two built-in testing panels as described in the previous sections, but also from the user's own applications.

This section introduces a few applications that the user can develop with the help of this toolkit. The user can create all the examples described in this section with or without LabVIEW, because the user always can incorporate the filter bank coefficients into his applications from previously saved text files.

Wavelet Packet Analysis

Figure 1:
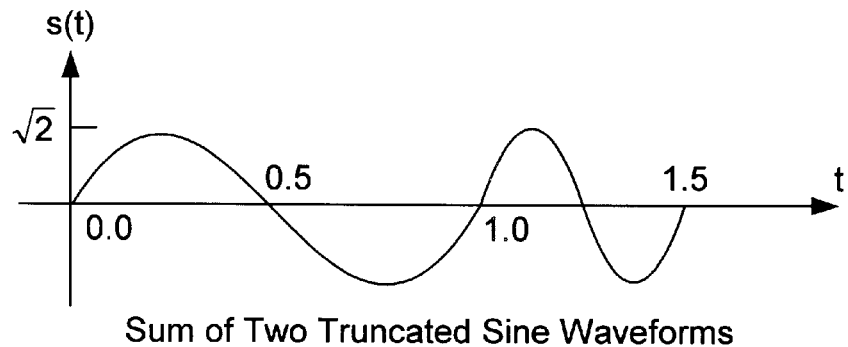
FIG. 1 illustrates a sum of two truncated sine waveforms.
Figure 2:
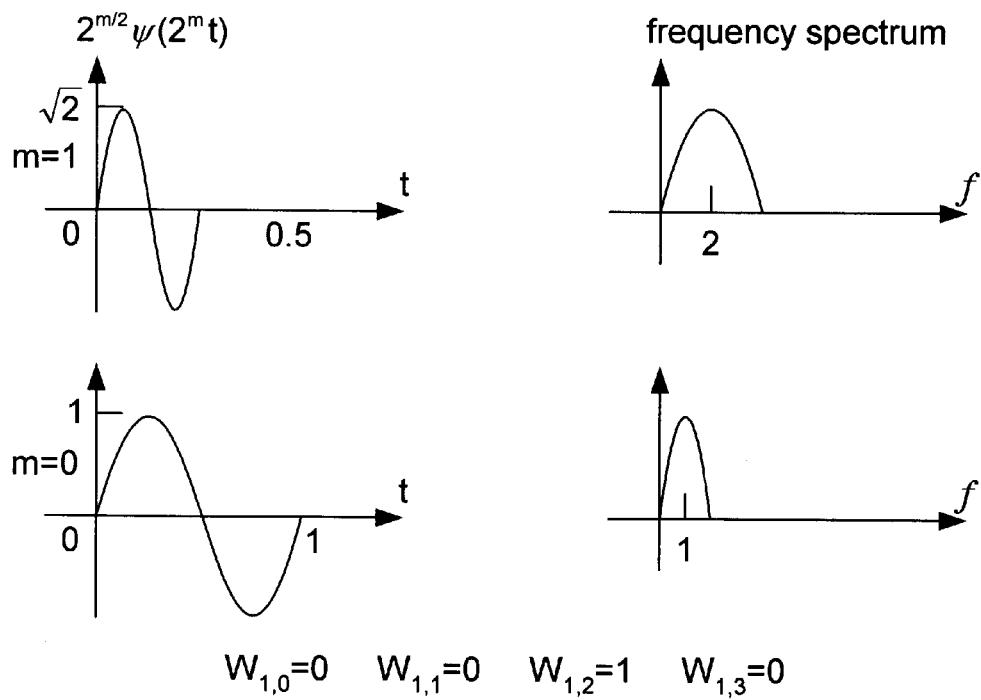
FIG. 2 illustrates example wavelets fo the waveform of FIG. 1.
Figure 3:
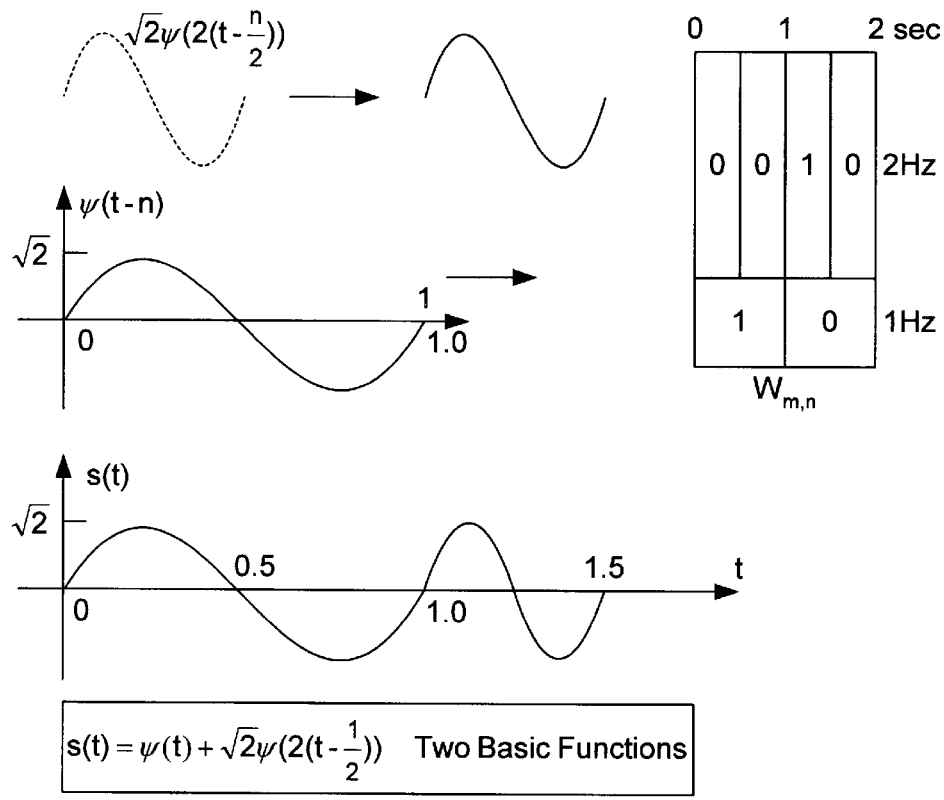
FIG. 3 illustrates a wavelet analysis for the waveform of FIG. 1.
Figure 4:
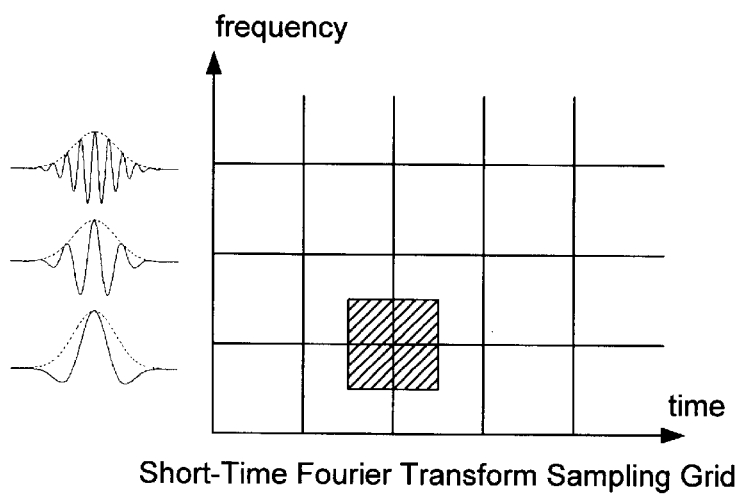
FIG. 4 illustrates a short-time Fourier transform sampling grid.
Figure 5:
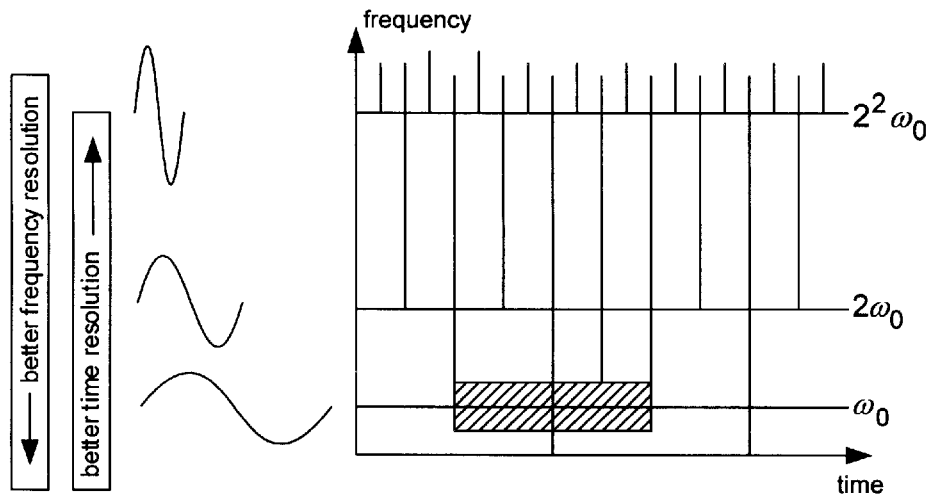
FIG. 5 illustrates a wavelet transform sampling grid.
Figure 6:
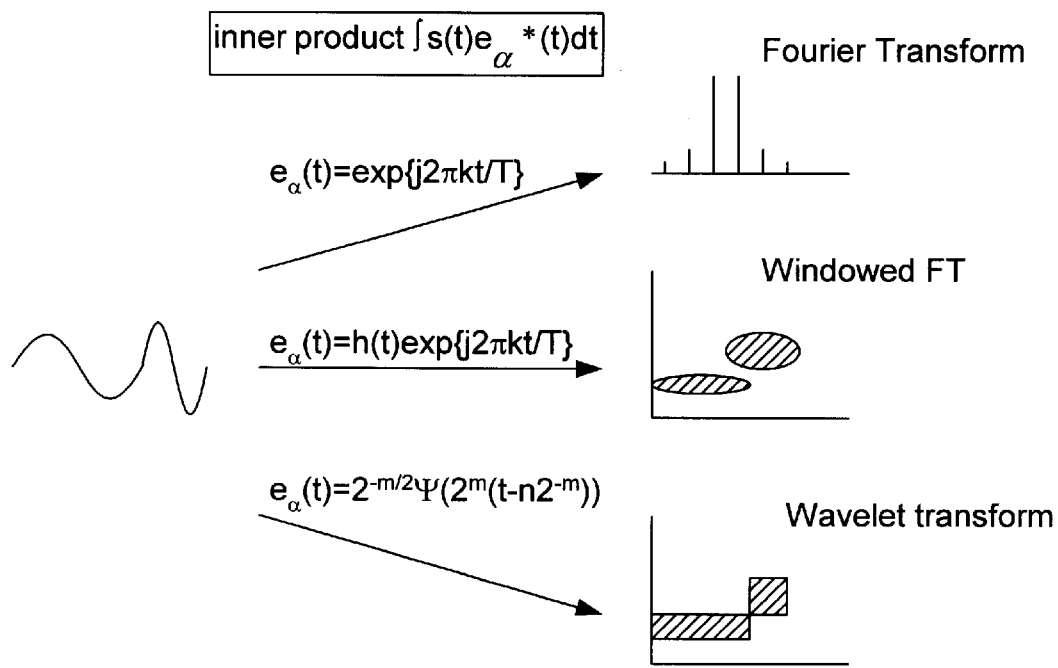
FIG. 6 illustrates a comparison of transform processes.
Figure 7:
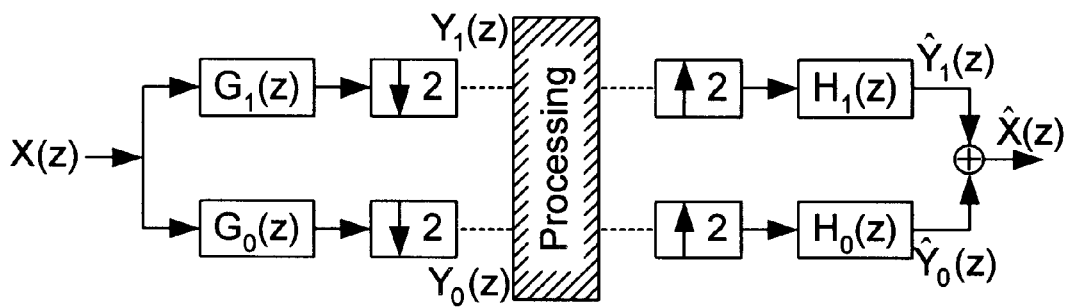
FIG. 7 illustrates a two-channel perfect reconstruction filter bank.
Figure 8:
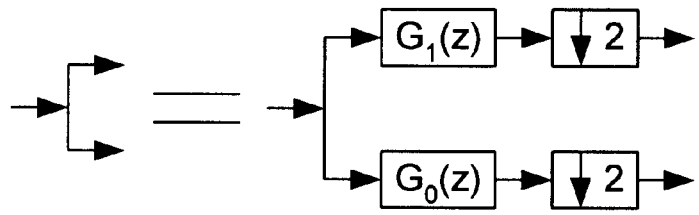
FIG. 8 illustrates a convention used to represent the filter bank of FIG. 7.
Figure 9:
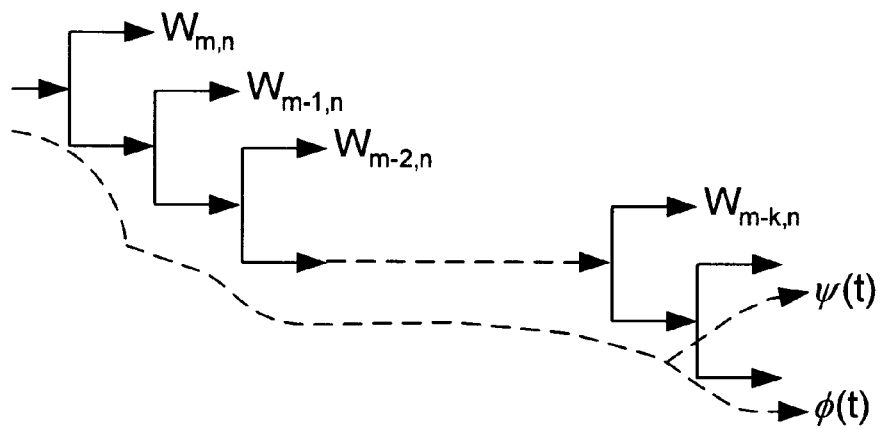
FIG. 9 illustrates a relationship of two-channel PR filter banks to the wavelet transform using the convention of FIG. 8.
Figure 10:
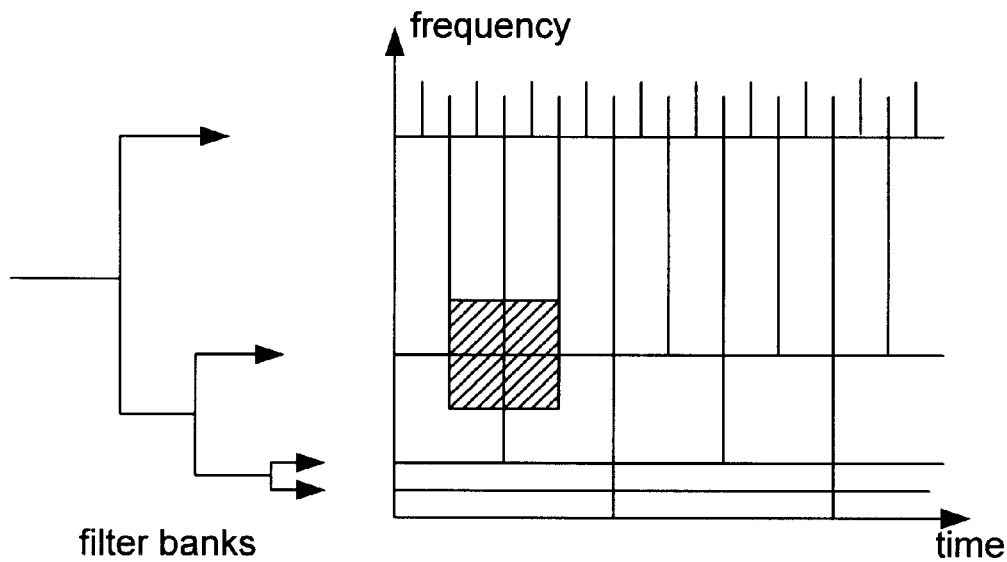
FIG. 10 illustrates a filter bank and wavelet transform coefficients.
Figure 11:
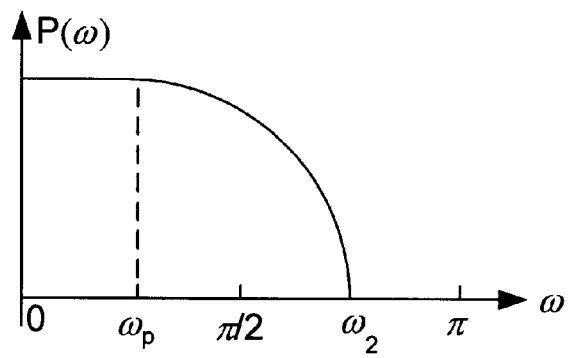
FIG. 11 illustrates a halfband filter.
Figure 12:
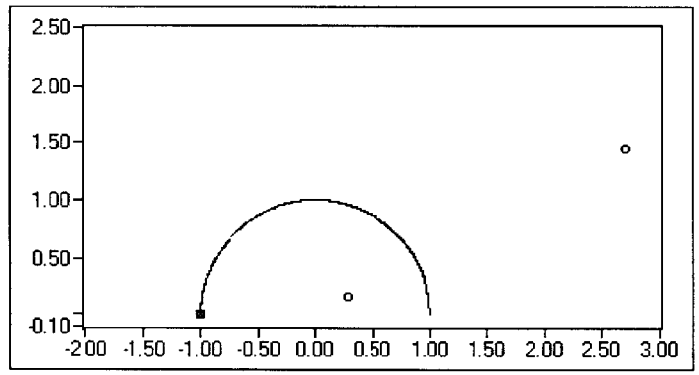
FIG. 12 illustrates zeros distribution for a maximum flat filter $P_0(z)$ for p=3.
Figure 13:
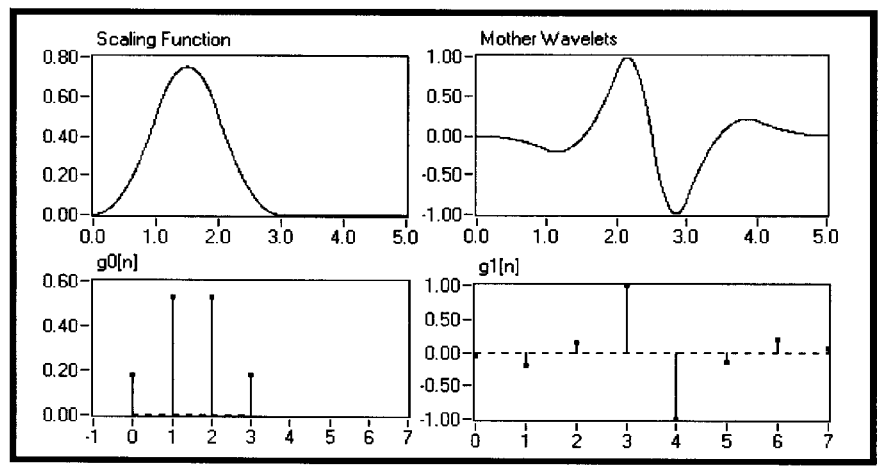
FIG. 13 illustrates the coefficients for a B-spline filter bank, as well as the corresponding scaling function and mother wavelet.
Figure 14:
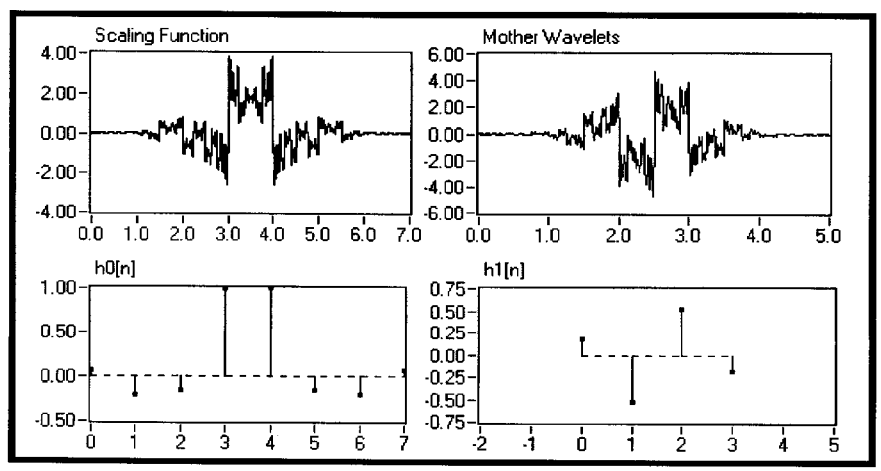
FIG. 14 illustrates the coefficients for a dual-B-spline filter bank, as well as the corresponding scaling function and mother wavelet.
Figure 15:
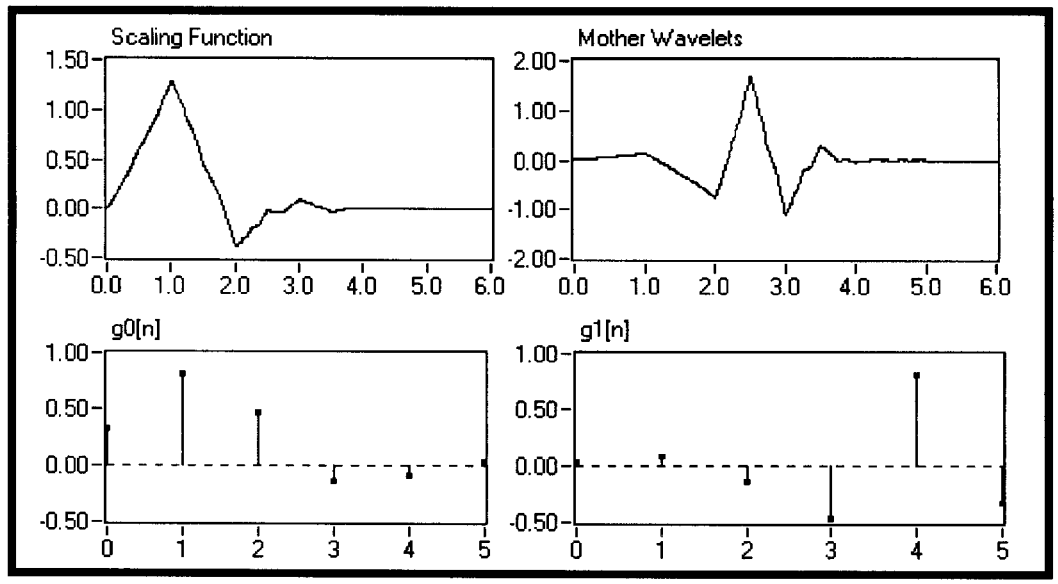
FIG. 15 illustrates a plot for a third order Daubechies filter bank, and the associated scaling function and wavelet.
Figure 16:
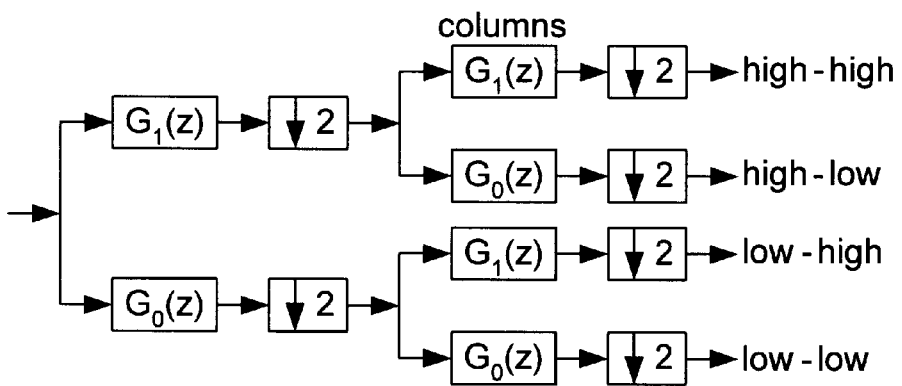
FIG. 16 illustrates use of two-channel PR filter banks for 2D signal processing.
Figure 31:
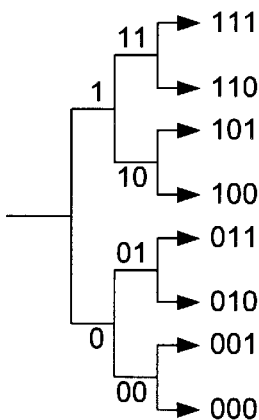
FIG. 31 illustrates a full path of a three level PR tree for decomposition.
Figure 32:
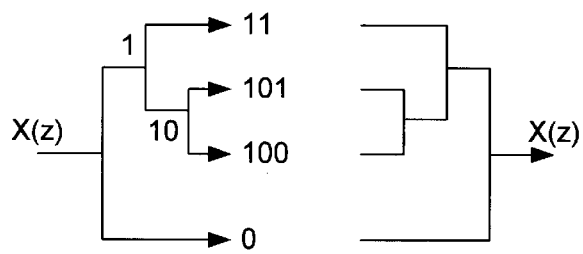
FIG. 32 illustrates synthesis filter banks which use coefficients to reconstruct the original signal.

The preceding sections introduce wavelet analysis in which the signal is continuously decomposed in the lowpass path, similar to the path shown in FIG. 9, Relationship of Two-Channel PR Filter Banks to Wavelet Transform. Other decomposition schemes can also be applied to the signal and still maintain the perfect reconstruction. FIG. 31, Full Path of a Three Level PR Tree, illustrates the full path for a three level decomposition. For example, the user can decompose the signal X as 0, 100, 101, and 11, then use those coefficients to reconstruct the original signal by the synthesis filter banks as shown in FIG. 32, Wavelet Packet. Although the user does not follow the ordinary wavelet decomposition scheme discussed in the earlier chapters in this case, the user can still fully recover the original signal X if the coefficients are not altered. This generalized wavelet decomposition is called a wavelet packet, which offers a wider range of possibilities for signal processing.

The path is completely determined by the applications on the hand. One common method is to check each node of the decomposition tree and quantify the information. Then, continue to decompose those nodes which contain more information. Such technique is traditionally called an entropy-based criterion.

Wavelet PacketOn-Line Testing Panel

To assist the user with testing his own applications, the main design panel saves the filter coefficients as the following global variables in the Wavelet Global VI:

Analysis Filter Coefficients—Contains coefficients of $G_0(z)$ and $G_1(z)$.

Synthesis Filter Coefficients—Contains coefficients of $H_0(z)$ and $H_1(z)$.

Figure 33:
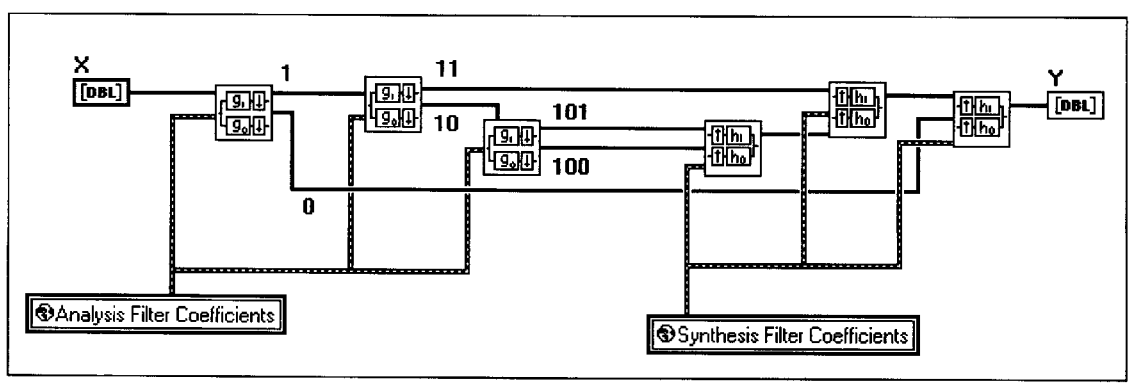
FIG. 33 illustrates a graphical program created in LabVIEW for the implementation of a wavelet packet.

These variables simultaneously change as the user changes the design. If the user incorporates those parameters into his own application, the user can see the effect of the different design. FIG. 33 illustrates how LabVIEW uses these two parameters to implement a Wavelet Packet similar to the one displayed in FIG. 32, Wavelet Packet.

Applications of Wavelet Analysis

Wavelet analysis can be used for a variety of functions, including detecting the discontinuity of a signal, removing the trend of a signal, suppressing noise, and compressing data.

Discontinuity Detection

Figure 36:
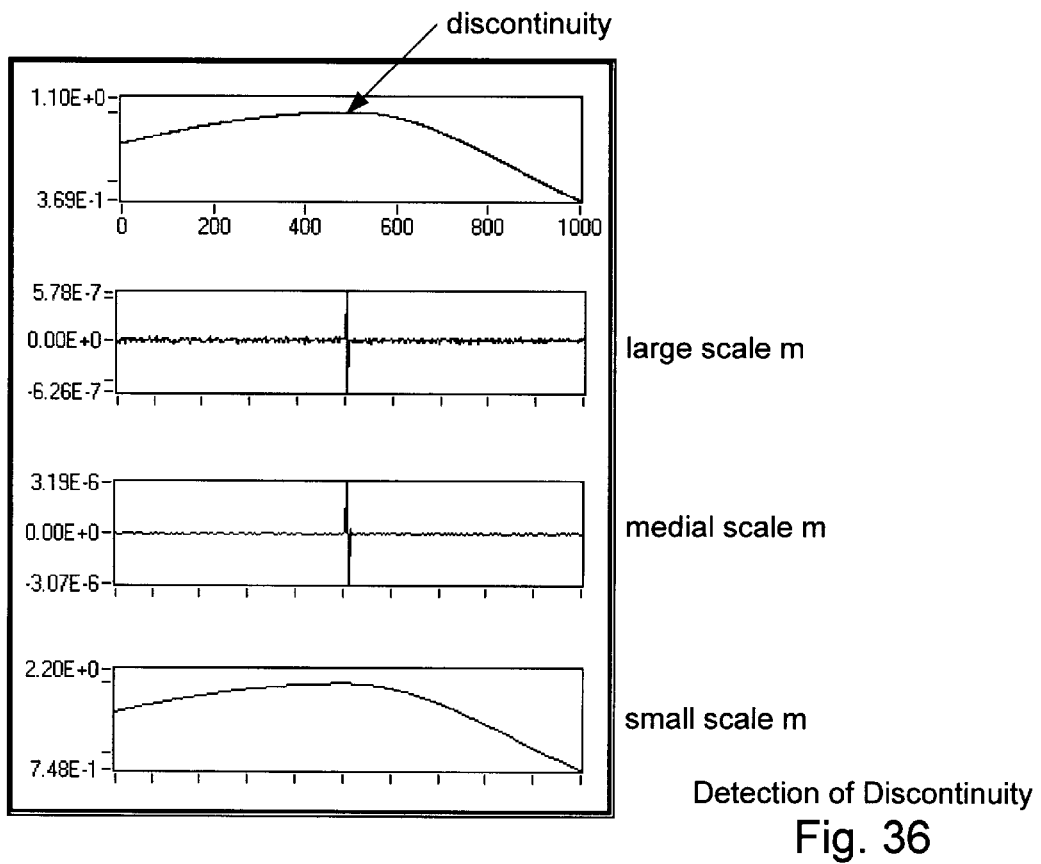
FIG. 36 illustrates a detection of discontinuity using wavelet analysis.

Wavelet analysis detects signal discontinuity, such as jumps, spikes, and other non-smooth features. Ridding signals of noise is often much easier to identify in the wavelet domain than in the original domain For example, the first plot of FIG. 36, Detection of Discontinuity, illustrates a signal s(k) made up of two exponential functions. The turning point or the discontinuity of the first derivative is at k=500. The remaining plots are wavelet coefficients with different scale factors m. As the scale factor increases, the user can pinpoint the location of the discontinuity.

Using wavelet analysis to detect the discontinuity or break point of a signal has helped to successfully repair scratches in old phonographs. The procedure works by taking the wavelet transform on the signal, smoothing unwanted spikes, and inverting the transform to reconstruct the original signal minus the noise.

In 1889, an agent of Thomas Edison used a wax cylinder to record Johannes Brahms performing his Hungarian Dance No. 1 in G minor. The recording was so poor that it was hard to discern the melody. By using the wavelet transform, researchers improved the sound quality enough to distinguish the melody.

Multiscale Analysis

Using wavelet analysis, one also can look at a signal from different scales, commonly called multiscale analysis. Wavelet transform-based multiscale analysis provides a better understanding of the signal and provides a useful tool for selectively discarding undesired components, such as noise and trend, that corrupt the original signals.

Figure 37:
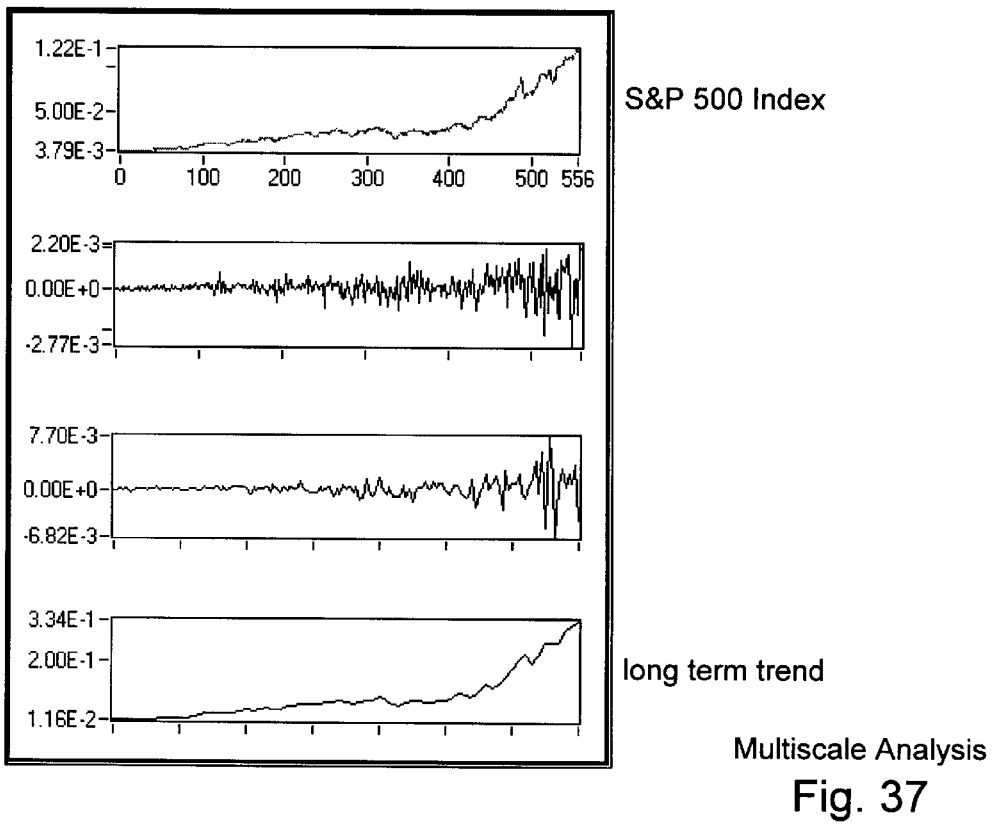
FIG. 37 illustrates a multiscale analysis using wavelet analysis.

FIG. 37 illustrates a multiscale analysis of an S&P 500 stock index during the years 1947 through 1993. The first plot displays a monthly S&P 500 index while the last plot describes the long term trend of the stock movement. The remaining two plots display the short term fluctuation of the stock, at different levels, during this time. To better characterize the fluctuation that reflects the short term behavior of the stock, the trend must be removed. To do this, the user first adjusts the wavelet decomposition level until a desired trend is obtained. Then, the user sets the corresponding wavelet coefficients to zero and reconstructs the original samples minus the trend.

Detrend

One of the most important issues in the application of joint time-frequency analysis is how to remove the trend. In most applications, the trend is often less interesting. It attaches to a strong DC component in the frequency spectrum and thereby blocks many other important signal features. Traditional detrend techniques usually remove the trend by lowpass filtering, thus blurring sharp features in the underlying signal. Wavelet-based detrend is somewhat superior to this process.

Figure 38:
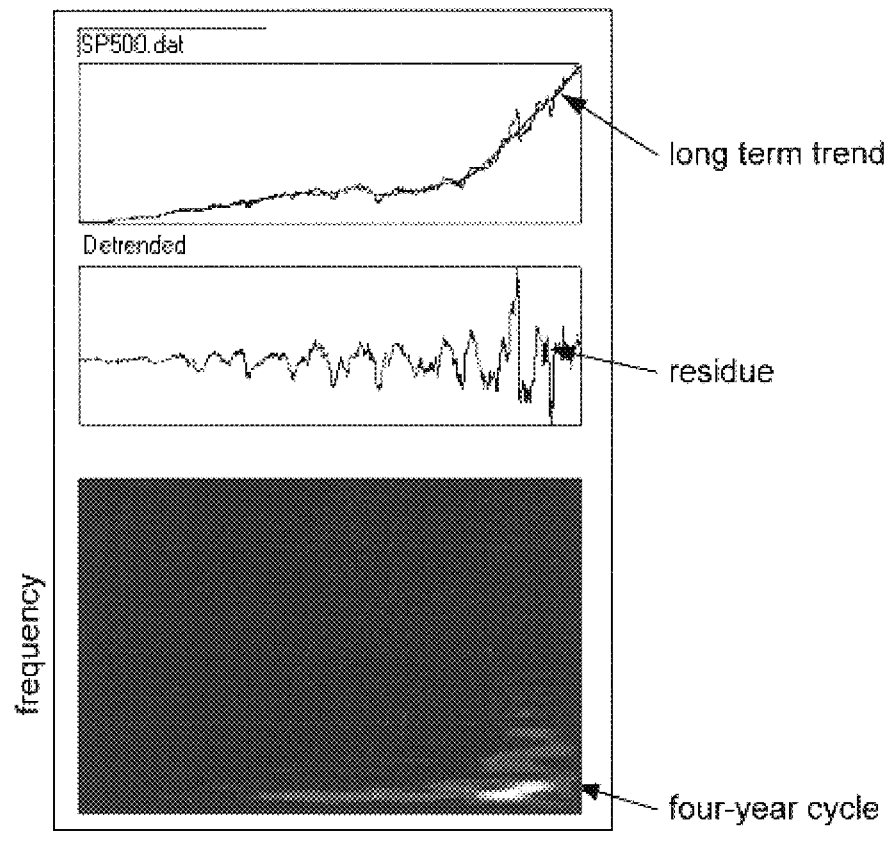
FIG. 38 illustrates a detrend application using wavelet analysis.

FIG. 38, Detrend, illustrates the same S&P 500 stock index information as FIG. 37, Multiscale Analysis, but as a joint time-frequency analysis. The top plot illustrates the S&P 500 stock index as well as its corresponding long term trend (smooth curve). The center plot displays the residue between the original data and the trend, reflecting the short-term fluctuation. The bottom plot displays the joint time and frequency behavior of the residue. It shows that over the past fifty years, a four-year cycle dominates the S&P 500 index, which agrees with most economist assertions.

Denoise

Unlike the conventional Fourier transform, which uses only one basis function, the wavelet transform provides an infinite number of mother wavelets to select. Consequently, wavelets can be selected that best match the signal. Once the wavelets match the signal, a few wavelet basis can be used to approximate the signal and achieve denoise.

Figure 39:
FIG. 39 illustrates a denoise application using wavelet analysis.

FIG. 39 illustrates one of the most successful applications of wavelet analysis—denoise. Although FIG. 39 only uses 25% of the data, the reconstruction preserves all important features contained in the original image. The left image is transformed into the wavelet basis with 75% of the wavelet components set to zero (those of smallest magnitude). The right image is reconstructed from the remaining 25% of the wavelet components.

Thus denoising is one of the most successful applications of the wavelet transform. This application works by first taking the wavelet transform of the signal, setting the coefficients below a certain threshold to zero, and finally inverting the transform to reconstruct the original signal. The resulting signal has less noise interference if the threshold is set properly. A detailed description of such wavelet transform-based denoising is found in D. L. Donoho's article "De-noise by soft thresholding" in the May 1995 issue of IEEE Transections Information Theory.

Figure 34A:
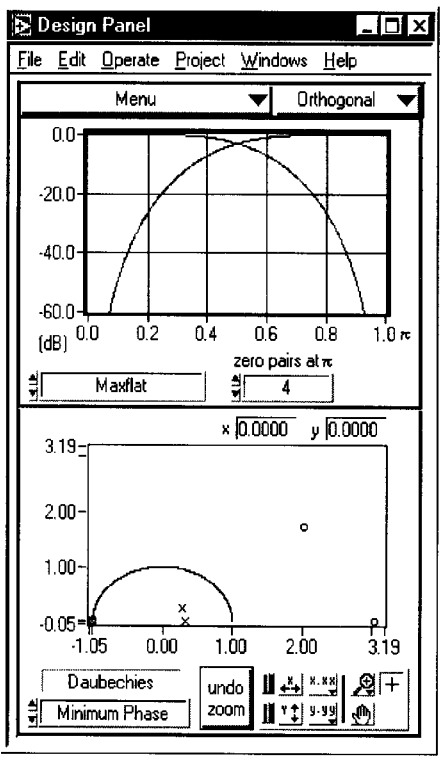
Figure 34B:
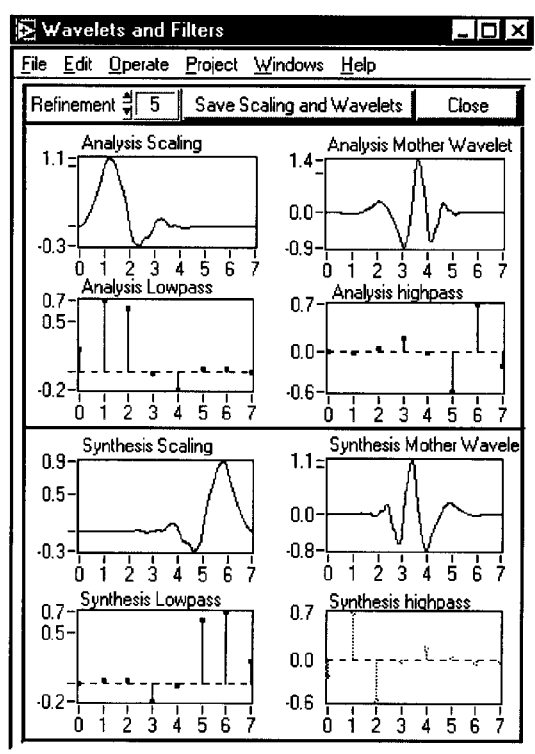
Figure 34C:
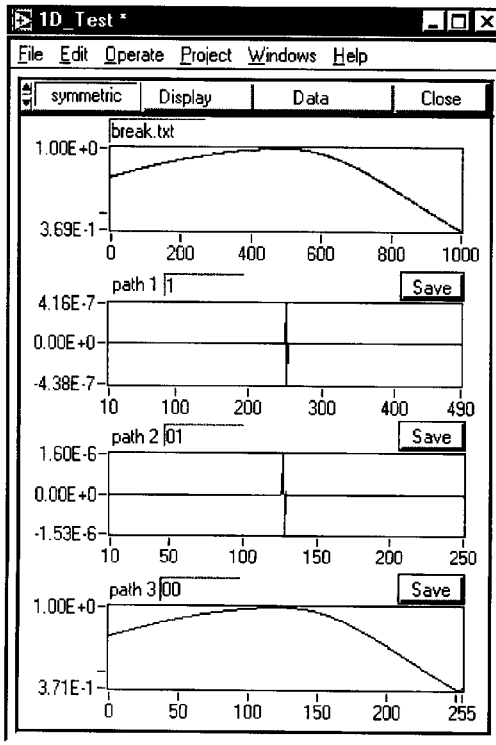
Figure 34D:
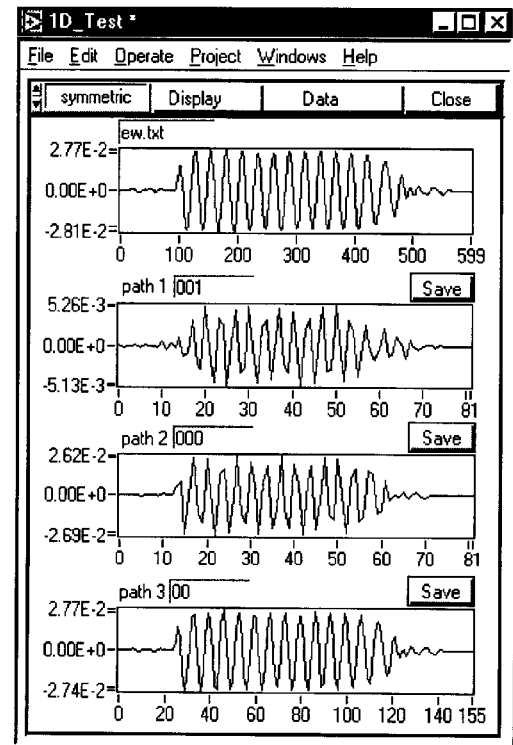

FIGS. 34a–d illustrate the present invention used to detect a discontinuity, wherein FIG. 34a illustrates the design panel, FIG. 34b illustrates the wavelets and filters, and FIGS. 34c and 34d illustrate 1D test panels. As shown, the discontinuity is clearly shown in FIG. 34c, thus indicating the proper mother wavelet for this application.

Figure 35A:
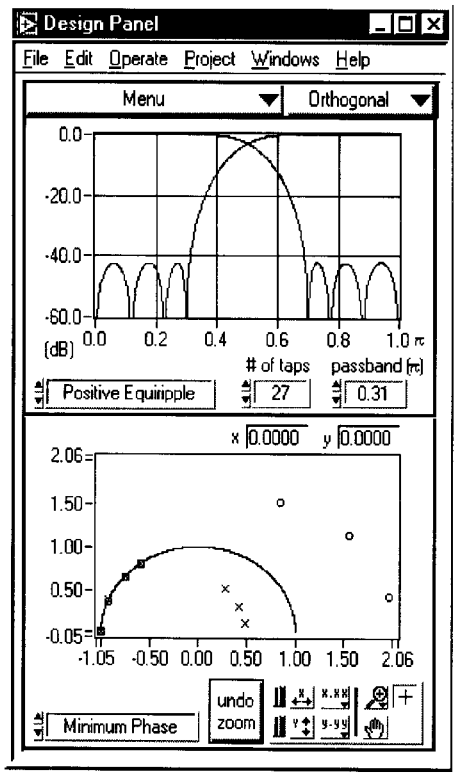
Figure 35B:
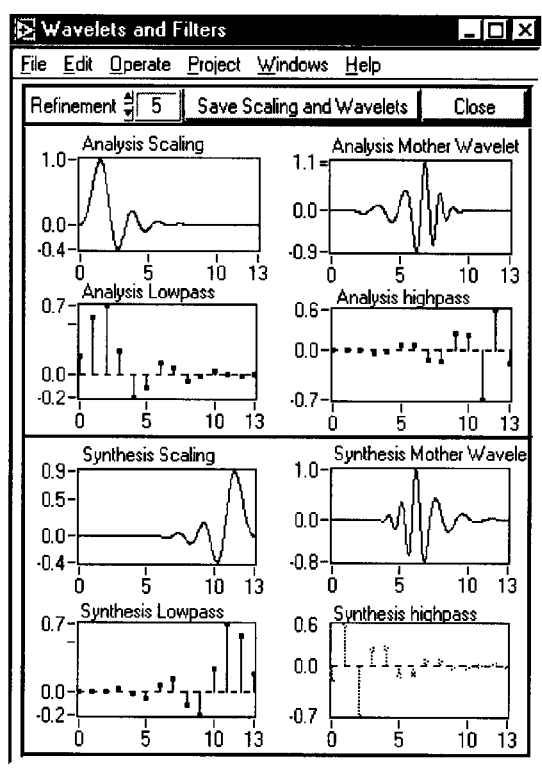
Figure 35C:
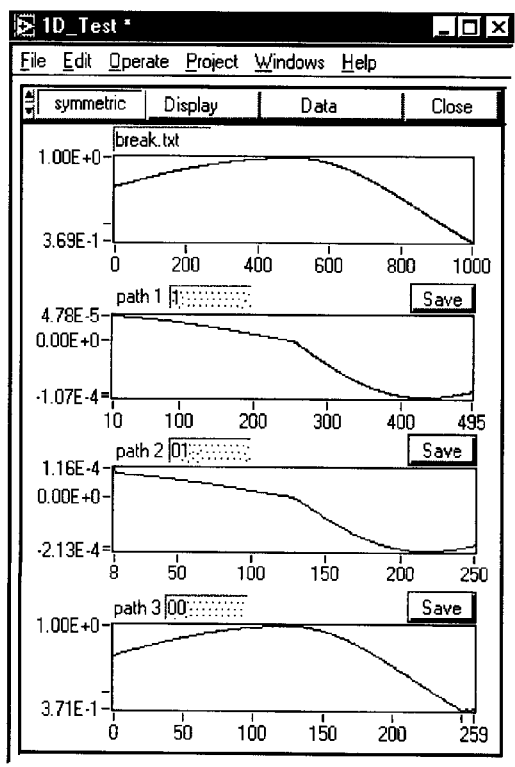
Figure 35D:
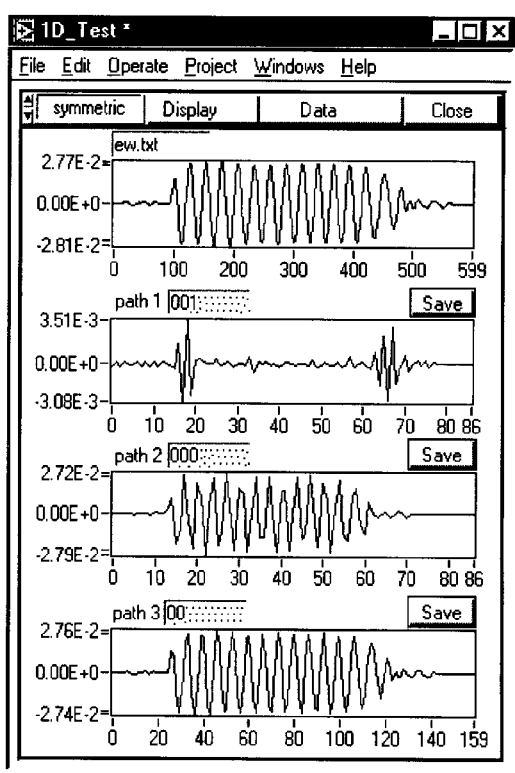

FIGS. 35a–d illustrate the present invention used for signal separation, wherein FIG. 35a illustrates the design panel, FIG. 35b illustrates the wavelets and filters, and FIGS. 35c and 35d illustrate 1D test panels. As shown, the signal separation is clearly shown in FIG. 35d, thus indicating the proper mother wavelet for this application.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A graphical method for designing a mother wavelet for a test signal on a computer system, wherein the mother wavelet is usable to process the test signal, the computer system including a display screen and a user input device, the method comprising:

selecting a filter P(z), wherein a mother wavelet is associated with said filter P(z);

factorizing P(z) into $G_0(z)$ and $H_0(z)$;

displaying on the screen a plot which illustrates a zeros distribution of $G_0(z)$ and $H_0(z)$;

adjusting said zeros distribution of said functions $G_0(z)$ and $H_0(z)$ in response to user input, wherein said adjusting said zeros distribution of said functions $G_0(z)$ and $H_0(z)$ operates to adjust said mother wavelet;

wherein said adjusting said zeros distribution of said functions $G_0(z)$ and $H_0(z)$ on said plot is performed one or more times until a desired mother wavelet is obtained;

wherein said desired mother wavelet is useable to process the test signal.

2. The method of claim 1, further comprising:

displaying on the screen said mother wavelet function;

wherein said mother wavelet function is displayed during at least a portion of said adjusting said zeros distribution of $G_0(z)$ and $H_0(z)$;

wherein said mother wavelet function is updated after each adjustment of said zeros distribution of $G_0(z)$ and $H_0(z)$;

wherein said displaying on the screen said mother wavelet function includes automatically upating said mother wavelet function in response to adjusting said zeros distribution of $G_0(z)$ and $H_0(z)$.

3. The method of claim 1, further comprising:

displaying on the screen a correlation of said test signal with one or more scaled versions of said mother wavelet;

wherein said correlation of said test signal with one or more scaled versions of said mother wavelet is displayed during at least a portion of said adjusting said zeros distribution of $G_0(z)$ and $H_0(z)$;

wherein said displaying on the screen said correlation of said test signal with one or more scaled versions of said mother wavelet includes automatically updating said correlation in response to said adjusting said zeros distribution of $G_0(z)$ and $H_0(z)$.

4. The method of claim 3, wherein said displaying on the screen said correlation of said test signal with one or more scaled versions of said mother wavelet comprises displaying said correlation for a scale of the mother wavelet;

the method further comprising:

selecting a first scale of said mother wavelet in response to user input;

wherein said correlation of said test signal with one or more scaled versions of said mother wavelet is displayed for said first scale of said mother wavelet.

5. The method of claim 1, further comprising:

displaying on the screen said mother wavelet function;

displaying on the screen a correlation of said test signal with one or more scaled versions of said mother wavelet;

wherein said mother wavelet function and said correlation of said test signal with one or more scaled versions of said mother wavelet are both displayed during at least a portion of said adjusting said zeros distribution of $G_0(z)$ and $H_0(z)$;

wherein said mother wavelet function and said correlation of said test signal with one or more scaled versions of said mother wavelet are both updated in response to said adjusting said zeros distribution of $G_0(z)$ and $H_0(z)$.

6. The method of claim 1, wherein said filter $P(z)$ is a product of said two low pass filters $G_0(z)$ and $H_0(z)$, the method further comprising:

displaying on the screen the frequency response of at least one of said filters $G_0(z)$ and $H_0(z)$, wherein said displaying on the screen the frequency response is performed during said adjusting said zeros distribution of $G_0(z)$ and $H_0(z)$ on said plot;

wherein said displaying on the screen the frequency response of at least one of said filters $G_0(z)$ and $H_0(z)$ includes automatically updating the frequency response in response to said adjusting said zeros distribution of $G_0(z)$ and $H_0(z)$ on said plot;

wherein said updating and displaying said frequency response as said zeros distribution of $G_0(z)$ and $H_0(z)$ on said plot is adjusted indicates performance of the mother wavelet.

7. The method of claim 1, wherein said adjusting comprises graphically manipulating said zeros distribution of $P(z)$ on said plot in response to user input.

8. The method of claim 1, wherein said adjusting comprises graphically manipulating at least one of said one or more of said zeros illustrated in said plot in response to user input to assign said at least one of said one or more of said zeros illustrated in said plot to said functions $G_0(z)$ and $H_0(z)$.

9. The method of claim 8, wherein said displaying on the screen said plot which illustrates a zeros distribution of $G_0(z)$ and $H_0(z)$ comprises displaying a plurality of zeros comprised in said plot;

wherein said assigning one or more of said zeros illustrated in said plot to said functions $G_0(z)$ and $H_0(z)$ comprises assigning each of said plurality of zeros to one of either said function $G_0(z)$ or said function $H_0(z)$.

10. The method of claim 9, wherein said assigning includes:

selecting at least one of said plurality of zeros;

assigning said selected one of said plurality of zeros to one of either said function $G_0(z)$ or said function $H_0(z)$ in response to user input.

11. The method of claim 10, wherein said displaying on the screen said plot which illustrates a zeros distribution of $G_0(z)$ and $H_0(z)$ comprises displaying a plurality of zeros comprised in said plot, wherein at least a subset of said plurality of zeros is initially assigned to one of either said function $G_0(z)$ or said function $H_0(z)$;

wherein said assigning includes:

selecting a first zero of said plurality of zeros, wherein said first zero is initially assigned to to one of either said function $G_0(z)$ or said function $H_0(z)$; and assigning said first zero to the other of said function $G_0(z)$ or said function $H_0(z)$ in response to user input.

12. The method of claim 1, wherein each zero includes a reciprocal; wherein said factorizing $P(z)$ into $G_0(z)$ and $H_0(z)$ further comprises:

selecting a zero assignment constraint in response to user input;

wherein said assigning one or more of said zeros illustrated in said plot to said functions $G_0(z)$ and $H_0(z)$ includes automatically assigning the reciprocal of said one or more of said zeros to one of said functions $G_0(z)$ and $H_0(z)$ based on said selected zero assignment constraint.

13. The method of claim 12, wherein said selecting said zero assignment constraint comprises selecting one of linear phase, minimum phase, B-Spline, or arbitrary.

14. The method of claim 1, further comprising:

selecting a type of filter $P(z)$, wherein said selecting the type of filter $P(z)$ comprises selecting either a maximum flat type of filter or equiripple type of filter.

15. The method of claim 14, wherein said selecting the type of filters comprises selecting a maximum flat type of filter;

the method further comprising:

selecting a number of zero pairs at pi in response to user input.

16. The method of claim 14, wherein said selecting the type of filters comprises selecting an equiripple type of filter;

the method further comprising:

setting a number of taps parameter in response to user input, wherein said number of taps parameter determines a number of coefficients of $P(z)$; and setting a normalized passband frequency, wherein said normalized passband frequency determines a normalized cutoff frequency of $P(z)$.

17. The method of claim 14, wherein said selecting the type of filter $P(z)$ includes selecting an orthogonal type or a biorthogonal type of filter.

18. The method of claim 1, wherein said displaying on the screen said plot which illustrates a zeros distribution of $G_0(z)$ and $H_0(z)$ comprises displaying a plurality of objects in said plot in locations corresponding to locations of said zeros, wherein each object represents one of said plurality of zeros, wherein objects corresponding to a first one or more zeros in the function $G_0(z)$ are displayed with a first color, and wherein objects corresponding to a second one or more zeros in the function $H_0(z)$ are displayed with a second color.

19. The method of claim 1, wherein said displaying on the screen said plot which illustrates a zeros distribution of $G_0(z)$ and $H_0(z)$ comprises displaying a plurality of objects in said plot in locations corresponding to locations of said zeros, wherein each object represents one of said plurality of zeros, wherein objects corresponding to a first one or more zeros in the function $G_0(z)$ are displayed with a first shape, and wherein objects corresponding to a second one or more zeros in the function $H_0(z)$ are displayed with a second shape.

20. The method of claim 1, further comprising displaying on the screen a design panel;
wherein said plot which illustrates said zeros distribution of $G_0(z)$ and $H_0(z)$ is displayed inside said panel;
wherein said adjusting said zeros distribution of $G_0(z)$ and $H_0(z)$ on said plot comprises manipulating said design panel in response to user input.

21. The method of claim 1, wherein said filter P(z) is a product of two low pass filters $G_0(z)$ and $H_0(z)$, wherein said filters $G_0(z)$ and $H_0(z)$ collectively comprise a perfect reconstruction filter bank, wherein two or more of said filter banks can be cascaded to form a tree of filter banks, wherein said mother wavelet is produced by an output of said tree of filter banks when an impulse response is applied to an input of said tree of said filter banks.

22. The method of claim 1, further comprising:
displaying on the screen a data test panel after said desired mother wavelet is obtained;
testing performance of the desired mother wavelet, wherein said testing performance includes displaying on the screen correlation of one or more scaled versions of said mother wavelet with said test signal on said data test panel.

23. The method of claim 1, wherein the zeros in the zeros distribution are symmetrical with respect to the x-axis;
wherein said displaying on the screen a plot which illustrates a zeros distribution of $G_0(z)$ and $H_0(z)$ comprises displaying a half of a coordinate plane.

24. The method of claim 1, wherein said desired mother wavelet is useable to represent the test signal.

25. A method for designing a filter bank for a test signal on a computer system, wherein a discrete wavelet transform is performed to process the test signal, the computer system including a display screen and a user input device, the method comprising:
displaying on the screen a filter P(z), wherein a mother wavelet is associated with said filter P(z);
factorizing P(z) into $G_0(z)$ and $H_0(z)$;
displaying on the screen a plot which illustrates a zeros distribution of $G_0(z)$ and $H_0(z)$;
adjusting said zeros distribution of said functions $G_0(z)$ and $H_0(z)$ in response to user input, wherein said adjusting said zeros distribution of said functions $G_0(z)$ and $H_0(z)$ operates to adjust said filter bank;
wherein said adjusting said zeros distribution of said functions $G_0(z)$ and $H_0(z)$ on said plot is performed one or more times until a desired filter bank is obtained;
wherein said desired filter bank is useable to compute a mother wavelet for the discrete wavelet transform used in processing the test signal.

26. A method for performing filter bank design for a signal on a computer system, the computer system including a display screen and a user input device, the method comprising:
selecting a type of filter bank in response to user input;
selecting a type of filter P(z), wherein said selecting the type of filter is performed based on a product P(z) of two filters $G_0(z)$ and $H_0(z)$;
factorizing P(z) into $G_0(z)$ and $H_0(z)$, wherein said factorizing includes:
displaying on the screen a plot which illustrates a zeros distribution of P(z);
assigning one or more of said zeros illustrated in said plot to said functions $G_0(z)$ and $H_0(z)$ in response to user input after said displaying said plot, wherein said assigning operates to determine said functions $G_0(z)$ and $H_0(z)$, wherein said functions $G_0(z)$ and $H_0(z)$ determine said filter bank, wherein said filter bank models a wavelet transform for said signal;
wherein said wavelet transform is useable to process the test signal.

27. A memory media which stores program instructions for designing a mother wavelet for a test signal on a computer system, wherein the mother wavelet is usable to process the test signal, the computer system including a display screen and a user input device, wherein the program instructions are executable to implement the steps of:
selecting a filter P(z), wherein a mother wavelet is associated with said filter P(z);
factorizing P(z) into $G_0(z)$ and $H_0(z)$;
displaying on the screen a plot which illustrates a zeros distribution of $G_0(z)$ and $H_0(z)$;
adjusting said zeros distribution of said functions $G_0(z)$ and $H_0(z)$ in response to user input, wherein said adjusting said zeros distribution of said functions $G_0(z)$ and $H_0(z)$ operates to adjust said mother wavelet;
wherein said adjusting said zeros distribution of said functions $G_0(z)$ and $H_0(z)$ on said plot is performed one or more times until a desired mother wavelet is obtained;
wherein said desired mother wavelet is useable to process the test signal.

28. The memory media of claim 27, wherein the program instructions are further executable to implement the step of:
displaying on the screen said mother wavelet function;
wherein said mother wavelet function is displayed during at least a portion of said adjusting said zeros distribution of $G_0(z)$ and $H_0(z)$;
wherein said displaying on the screen said mother wavelet function includes automatically upating said mother wavelet function in response to adjusting said zeros distribution of $G_0(z)$ and $H_0(z)$.

29. The memory media of claim 27, wherein the program instructions are further executable to implement the step of:
displaying on the screen a correlation of said test signal with one or more scaled versions of said mother wavelet;
wherein said correlation of said test signal with one or more scaled versions of said mother wavelet is displayed during at least a portion of said adjusting said zeros distribution of $G_0(z)$ and $H_0(z)$;
wherein said displaying on the screen said correlation of said test signal with one or more scaled versions of said mother wavelet includes automatically updating said correlation in response to said adjusting said zeros distribution of $G_0(z)$ and $H_0(z)$.

30. The memory media of claim 29, wherein said displaying on the screen said correlation of said test signal with one or more scaled versions of said mother wavelet comprises displaying said correlation for a scale of the mother wavelet;
   wherein the program instructions are further executable to implement the step of:
      selecting a first scale of said mother wavelet in response to user input;
   wherein said correlation of said test signal with one or more scaled versions of said mother wavelet is displayed for said first scale of said mother wavelet.

31. The memory media of claim 27, wherein the program instructions are further executable to implement the steps of::
   displaying on the screen said mother wavelet function;
   displaying on the screen a correlation of said test signal with one or more scaled versions of said mother wavelet;
   wherein said mother wavelet function and said correlation of said test signal with one or more scaled versions of said mother wavelet are both displayed during at least a portion of said adjusting said zeros distribution of $G_0(z)$ and $H_0(z)$;
   wherein said mother wavelet function and said correlation of said test signal with one or more scaled versions of said mother wavelet are both updated in response to said adjusting said zeros distribution of $G_0(z)$ and $H_0(z)$.

32. The memory media of claim 27, wherein said filter $P(z)$ is a product of the two low pass filters $G_0(z)$ and $H_0(z)$, wherein the program instructions are further executable to implement the step of:
   displaying on the screen the frequency response of at least one of said filters $G_0(z)$ and $H_0(z)$, wherein said displaying on the screen the frequency response is performed during said adjusting said zeros distribution of $G_0(z)$ and $H_0(z)$ on said plot;
   wherein said displaying on the screen the frequency response of at least one of said filters $G_0(z)$ and $H_0(z)$ includes automatically updating the frequency response in response to said adjusting said zeros distribution of $G_0(z)$ and $H_0(z)$ on said plot;
   wherein said updating and displaying said frequency response as said zeros distribution of $G_0(z)$ and $H_0(z)$ on said plot is adjusted indicates performance of the mother wavelet.

33. The memory media of claim 27, wherein said adjusting comprises graphically manipulating said zeros distribution of $G_0(z)$ and $H_0(z)$ on said plot in response to user input to assign said at least one of said one or more of said zeros illustrated in said plot to said functions $G_0(z)$ and $H_0(z)$.

34. The memory media of claim 33, wherein said displaying on the screen said plot which illustrates a zeros distribution of $G_0(z)$ and $H_0(z)$ comprises displaying a plurality of zeros comprised in said plot, wherein at least a subset of said plurality of zeros is initially assigned to one of either said function $G_0(z)$ or said function $H_0(z)$;
   wherein said adjusting includes:
      selecting a first zero of said plurality of zeros, wherein said first zero is initially assigned to to one of either said function $G_0(z)$ or said function $H_0(z)$; and
      assigning said first zero to the other of said function $G_0(z)$ or said function $H_0(z)$ in response to user input.

35. The memory media of claim 27, wherein each zero includes a reciprocal; wherein said factorizing $P(z)$ into $G_0(z)$ and $H_0(z)$ further comprises:
   selecting a zero assignment constraint in response to user input;
   wherein said assigning one or more of said zeros illustrated in said plot to said functions $G_0(z)$ and $H_0(z)$ includes automatically assigning the reciprocal of said one or more of said zeros to one of said functions $G_0(z)$ and $H_0(z)$ based on said selected zero assignment constraint.

36. The memory media of claim 35, wherein said selecting said zero assignment constraint comprises selecting one of linear phase, minimum phase, B-Spline, or arbitrary.

37. The memory media of claim 27, wherein said program instructions are further operable to implement the step of:
   selecting a type of filter $P(z)$, wherein said selecting the type of filter $P(z)$ comprises selecting either a maximum flat type of filter or equiripple type of filter.

38. The memory media of claim 37, wherein said selecting the type of filters comprises selecting a maximum flat type of filter;
   wherein the program instructions are further executable to implement the step of:
      selecting a number of zero pairs at pi in response to user input.

39. The memory media of claim 37, wherein said selecting the type of filters comprises selecting an equiripple type of filter;
   wherein the program instructions are further executable to implement the steps of:
      setting a number of taps parameter in response to user input, wherein said number of taps parameter determines a number of coefficients of $P(z)$; and
      setting a normalized passband frequency, wherein said normalized passband frequency determines a normalized cutoff frequency of $P(z)$.

40. The memory media of claim 37, wherein said selecting the type of filter $P(z)$ includes selecting an orthogonal type or a biorthogonal type of filter.

41. The memory media of claim 27, wherein said displaying on the screen said plot which illustrates a zeros distribution of $G_0(z)$ and $H_0(z)$ comprises displaying a plurality of objects in said plot in locations corresponding to locations of said zeros, wherein each object represents one of said plurality of zeros, wherein objects corresponding to a first one or more zeros in the function $G_0(z)$ are displayed with a first color, and wherein objects corresponding to a second one or more zeros in the function $H_0(z)$ are displayed with a second color.

42. The memory media of claim 27, wherein said displaying on the screen said plot which illustrates a zeros distribution of $G_0(z)$ and $H_0(z)$ comprises displaying a plurality of objects in said plot in locations corresponding to locations of said zeros, wherein each object represents one of said plurality of zeros, wherein objects corresponding to a first one or more zeros in the function $G_0(z)$ are displayed with a first shape, and wherein objects corresponding to a second one or more zeros in the function $H_0(z)$ are displayed with a second shape.

43. The memory media of claim 27, wherein said filter $P(z)$ is a product of said two low pass filters $G_0(z)$ and $H_0(z)$, wherein said filters $G_0(z)$ and $H_0(z)$ collectively comprise a perfect reconstruction filter bank, wherein two or more of said filter banks can be cascaded to form a tree of filter banks, wherein said mother wavelet is produced by an output of said tree of filter banks when an impulse response is applied to an input of said tree of said filter banks.

44. The method of claim 27, wherein the program instructions are further executable to implement the steps of:
displaying on the screen a data test panel after said desired mother wavelet is obtained;
testing performance of the desired mother wavelet, wherein said testing performance includes displaying on the screen correlation of one or more scaled versions of said mother wavelet with said test signal on said data test panel.

45. The memory media of claim 27, wherein said desired mother wavelet is useable to represent the test signal.

* * * * *